(12) United States Patent
Wang et al.

(10) Patent No.: US 12,574,822 B2
(45) Date of Patent: Mar. 10, 2026

(54) METHOD FOR DETERMINING MEC ACCESS POINT AND APPARATUS

(71) Applicant: HUAWEI TECHNOLOGIES CO., LTD., Shenzhen (CN)

(72) Inventors: Yaxin Wang, Shenzhen (CN); Yan Li, Beijing (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 18/344,598

(22) Filed: Jun. 29, 2023

(65) Prior Publication Data

US 2023/0345347 A1 Oct. 26, 2023

Related U.S. Application Data

(63) Continuation of application No. PCT/CN2020/142427, filed on Dec. 31, 2020.

(51) Int. Cl.
H04L 41/12 (2022.01)
H04W 40/24 (2009.01)

(52) U.S. Cl.
CPC ............. H04W 40/24 (2013.01); H04L 41/12 (2013.01)

(58) Field of Classification Search
None
See application file for complete search history.

(56) References Cited

U.S. PATENT DOCUMENTS 10,708,716 B2 * 7/2020 Stammers ........... H04L 67/1021
11,050,813 B2 * 6/2021 Sabella ............. H04W 28/0205

2019/0261260 A1 * 8/2019 Dao ......................... H04W 8/20
2020/0154459 A1 * 5/2020 Mukherjee .......... H04W 72/535
2020/0267084 A1 * 8/2020 Hande ................... H04L 47/283
(Continued)

FOREIGN PATENT DOCUMENTS

WO 2020020442 A1 1/2020

OTHER PUBLICATIONS

3GPP TS 23.501 V16.7.0 (Dec. 2020), 3rd Generation Partnership Project, Technical Specification Group Services and System Aspects, System architecture for the 5G System (5GS), total 442 pages.
(Continued)

*Primary Examiner* — Jason D Cardone

(74) *Attorney, Agent, or Firm* — HAUPTMAN HAM, LLP

(57) ABSTRACT

A method includes obtaining a first multi-access edge computing (MEC) access point to be accessed by terminals in a terminal group of a first service. The first MEC access point is obtained based on network topology information of MEC access points that are respectively closest to the terminals and that support the first service. The network topology information indicates at least one of whether at least two MEC access points are connected or performance of a link between at least two MEC access points. The terminal group includes one or more of a terminal requesting the first service or a terminal subscribing to the first service. The method also includes sending an identifier of the first MEC access point to a session management network element that controls the terminals. The identifier of the first MEC access point is used by the terminals to access the first MEC access point.

20 Claims, 17 Drawing Sheets

(56)                    References Cited

U.S. PATENT DOCUMENTS

| | | | | |
|---|---|---|---|---|
| 2020/0274787 | A1* | 8/2020 | Dasgupta | H04L 43/0888 |
| 2021/0306937 | A1* | 9/2021 | Hua | H04W 8/183 |
| 2022/0191650 | A1* | 6/2022 | Kim | H04W 4/20 |
| 2022/0417731 | A1* | 12/2022 | Tsuda | H04W 24/02 |
| 2023/0035778 | A1* | 2/2023 | Han | H04L 47/2441 |
| 2023/0074288 | A1* | 3/2023 | Filippou | H04L 47/127 |
| 2023/0086095 | A1* | 3/2023 | Sato | H04L 43/0852 |
| | | | | 709/224 |

OTHER PUBLICATIONS

Search report dated Jan. 9, 2024 from corresponding application No. EP 20967866.

* cited by examiner

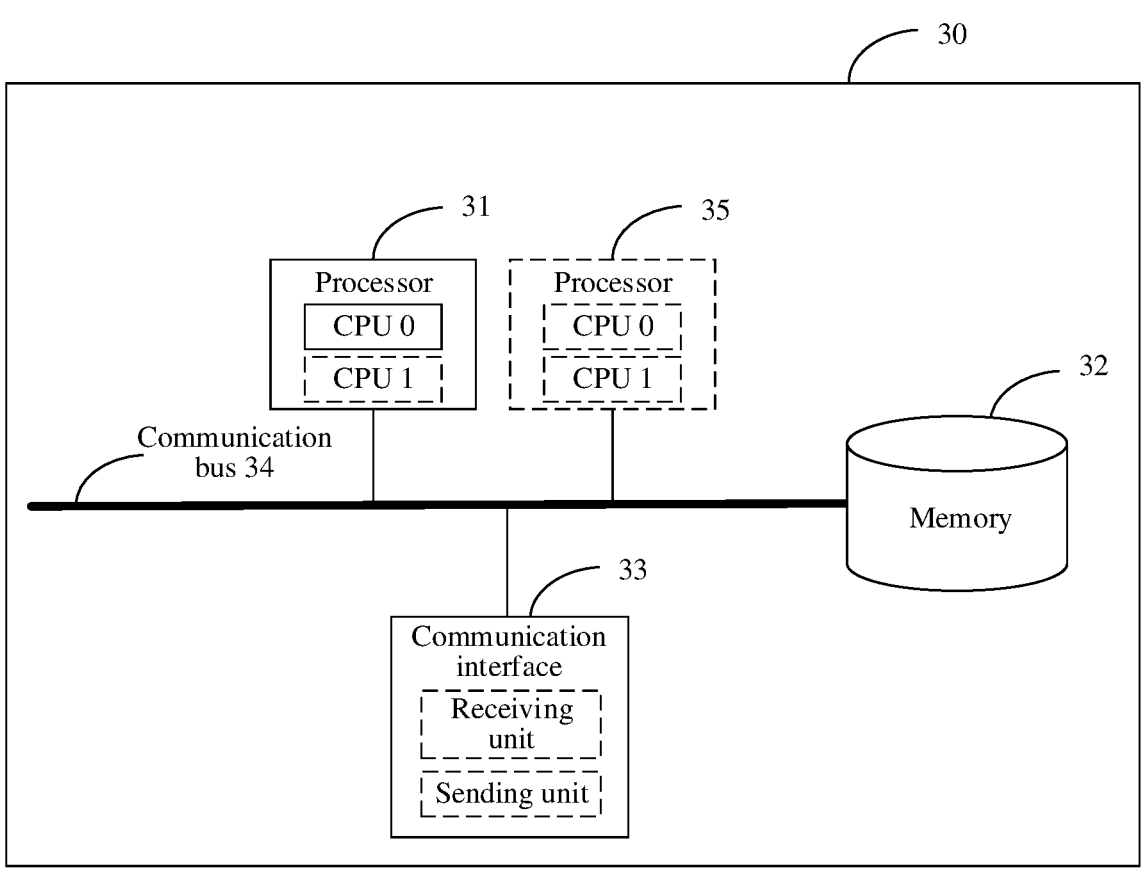

FIG. 3

| A first network element obtains a first MEC access point to be accessed by a terminal group of a first service, where the first MEC access point is obtained based on at least network topology information of MEC access points that are respectively closest to all terminals in the terminal group and that support the first service | S401 |

| The first network element sends an identifier of the first MEC access point to a session management network element that controls each terminal in the terminal group, where the identifier of the first MEC access point is used for each terminal in the terminal group to access the first MEC access point | S402 |

FIG. 4

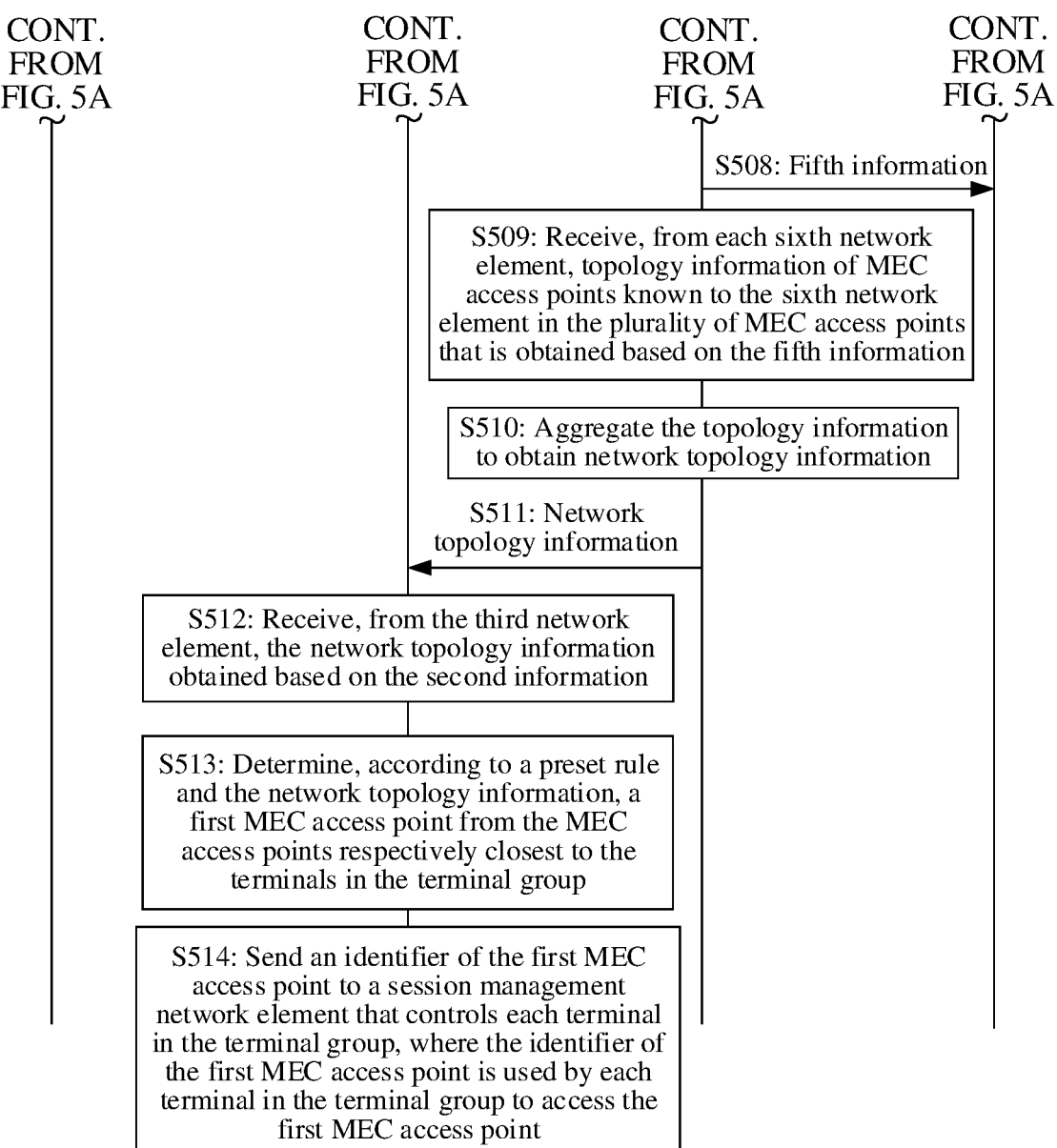

CONT.
FROM
FIG. 5A

CONT.
FROM
FIG. 5A

CONT.
FROM
FIG. 5A

CONT.
FROM
FIG. 5A

S508: Fifth information

S509: Receive, from each sixth network element, topology information of MEC access points known to the sixth network element in the plurality of MEC access points that is obtained based on the fifth information S510: Aggregate the topology information to obtain network topology information S511: Network topology information S512: Receive, from the third network element, the network topology information obtained based on the second information S513: Determine, according to a preset rule and the network topology information, a first MEC access point from the MEC access points respectively closest to the terminals in the terminal group S514: Send an identifier of the first MEC access point to a session management network element that controls each terminal in the terminal group, where the identifier of the first MEC access point is used by each terminal in the terminal group to access the first MEC access point

FIG. 5B

CONT. FROM FIG. 8A          CONT. FROM FIG. 8A

METHOD FOR DETERMINING MEC ACCESS POINT AND APPARATUS

CROSS-REFERENCE TO RELATED APPLICATIONS

This application is a continuation of International Application No. PCT/CN2020/142427, filed on Dec. 31, 2020, the disclosure of which is hereby incorporated by reference in its entirety.

TECHNICAL FIELD

Embodiments of this application relate to the communications field, and in particular, to a method for determining a multi-access edge computing (MEC) access point and an apparatus.

BACKGROUND

A 5th-generation (5G) mobile communication network requires a lower latency and more decentralization, and a multi-access edge computing (MEC) technology can well meet this requirement. A basic idea of MEC is to migrate a cloud computing platform from the interior of a mobile core network to an edge of a mobile access network for elastic use of computing and storage resources. An MEC server may be regarded as a cloud server running on an edge of a mobile network and running a specific task.

In a scenario of MEC deployment in a 5G network, a small-scale or portable data center, referred to as an MEC server, is deployed at a network edge to process terminal requests locally. This helps implement application localization, content distribution, and computing marginalization, thereby meeting an ultra-low latency requirement.

To better leverage edge computing capabilities, 5G edge computing uses a reference architecture of the European Telecommunications Standards Institute (ETSI) for edge computing to enable a user plane function (UPF) to serve as a data plane anchor to be a key for integration between the ETSI and the 3rd generation partnership project (3GPP). In 5G edge computing, an edge computing platform (that is, the MEC server) implements functions of a data network (DN) and an AF.

In an MEC scenario, when it is determined to enable the MEC server to provide services for user equipment (UE), or an MEC server that provides services changes after a location of the UE changes or a service changes, a network side AF selects a data network access identifier (DNAI) corresponding to an MEC server supporting a related service as an access point of the UE, and an SMF starts a DNAI change procedure, and adds, to a PDU session of the UE, a branch point for steering traffic to a UPF corresponding to the selected DNAI, to implement a connection from the UE to the MEC server or a path adjustment.

However, for users in a terminal group, to ensure service quality of the users in the terminal group, the AF selects a same DNAI as an access point for each user in the terminal group. Currently, the AF selects the DNAI according to an internet protocol (IP) address of the user in the group. Therefore, the DNAI selected by the AF may not be optimal for a location of the user in the group. As a result, the user accesses an MEC server that is not optimal, affecting service quality.

SUMMARY

This application provides a method for determining an MEC access point, an apparatus, and a system, to select, for users in a terminal group, an MEC access point which is optimal for location distributions of the users, so as to improve service quality.

To achieve the foregoing objectives, the following technical solutions are used in this application.

According to a first aspect, a method for determining an MEC access point is provided, and the method may include: A first network element obtains a first MEC access point to be accessed by a terminal group of a first service, where the first MEC access point is obtained based on at least network topology information of MEC access points that are respectively closest to all terminals in the terminal group and that support the first service. The network topology information indicates whether at least two MEC access points are connected, and/or the network topology information indicates performance of a link between at least two MEC access points. The first network element sends an identifier of the first MEC access point to a session management network element that controls each terminal, where the identifier of the first MEC access point is used for each terminal to access the first MEC access point. The terminal group of the first service includes a terminal requesting the first service and/or a terminal subscribing to the first service.

According to the method for determining an MEC access point provided in this embodiment of this application, the MEC access point to be accessed by users in the terminal group is determined based on the network topology information of the MEC access points respectively closest to the terminals in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

The first network element may be an application function (AF) network element or a network exposure function (NEF) network element.

In a possible implementation, that a first network element obtains a first MEC access point to be accessed by a terminal group of a first service may be implemented as follows: The first network element sends first information to a second network element corresponding to each terminal in the terminal group of the first service, where the first information includes identifiers of the MEC access points supporting the first service and an identifier of a terminal managed by the second network element in the terminal group. The first network element receives, from each second network element, an identifier of an MEC access point closest to each terminal in the terminal group that is determined based on the first information. The first network element sends second information to a third network element, where the second information includes the identifier of the MEC access point closest to each terminal in the terminal group. The first network element receives, from the third network element, the network topology information obtained based on the second information. The first network element determines, according to a preset rule and the network topology information, the first MEC access point from the MEC access points respectively closest to the terminals. The first network element obtains the MEC access points respectively closest to the terminals in the terminal group, and then obtains the network topology information of the MEC access points respectively closest to the terminals. Then, the first network element determines the first MEC access point based on the obtained network topology information. In this way, network resources are saved while user experience is improved. The execution entity of the solution is effectively and flexibly designed, and application scenarios are expanded.

The second network element may be a session management network element. The first information may be used to obtain an MEC access point closest to each terminal included in the first information. The second information may be used to obtain the network topology information of the MEC access points respectively closest to the terminals.

In another possible implementation, that a first network element obtains a first MEC access point to be accessed by a terminal group of a first service may be implemented as follows: The first network element sends first information to a second network element corresponding to each terminal in the terminal group, where the first information includes identifiers of the MEC access points supporting the first service and an identifier of a terminal managed by the second network element in the terminal group. The first network element receives, from each second network element, an MEC access point closest to each terminal in the terminal group that is determined based on the first information. The first network element sends third information to a fourth network element, where the third information includes an identifier of the MEC access point closest to each terminal in the terminal group. The first network element receives, from the fourth network element, the identifier of the first MEC access point that is determined based on the third information. The first network element obtains the MEC access point closest to each terminal in the terminal group, and then the first network element provides the identifier of the MEC access point closest to each terminal in the terminal group to the fourth network element, and the fourth network element determines the first MEC access point and feeds back the first MEC access point to the first network element. In this way, network resources are saved while user experience is improved. The execution entity of the solution is effectively and flexibly designed, and application scenarios are expanded.

The fourth network element may be a session management network element or an edge configuration server (ECS). The third information is used to determine the first MEC access point to be accessed by the terminal group of the first service.

In another possible implementation, that a first network element obtains a first MEC access point to be accessed by a terminal group of a first service may be implemented as follows: The first network element sends fourth information to a fifth network element, where the fourth information includes an identifier of each terminal in the terminal group and identifiers of the MEC access points supporting the first service. The first network element receives, from the fifth network element, the identifier of the first MEC access point that is determined based on the fourth information. The fifth network element selects the first MEC access point, so as to save network resources on a premise of improving user experience. In addition, the execution entity of the solution is effectively and flexibly designed, and application scenarios are expanded.

The fifth network element may be a session management network element. The fourth information may indicate to select the first MEC access point.

In another possible implementation, the preset rule may include: determining the first MEC access point from the network topology information based on loads and/or delays of the MEC access points, so as to select the first MEC access point that meets an actual requirement and that can save network resources while improving user experience.

According to a second aspect, another method for determining an MEC access point is provided, and the method may include: A third network element receives second information from a first network element, where the second information includes identifiers of a plurality of MEC access points, and the MEC access points support a first service. The third network element obtains a sixth network element corresponding to each MEC access point of the plurality of MEC access points. The third network element sends fifth information to each sixth network element, where the fifth information includes the identifiers of the plurality of MEC access points in the second information. The third network element receives, from each sixth network element, topology information of MEC access points known to the sixth network element in the plurality of MEC access points, where the topology information is obtained based on the fifth information and indicates whether at least two MEC access points are connected, and/or the topology information indicates performance of a link between at least two MEC access points. The third network element aggregates the received topology information to obtain the network topology information. The third network element sends the network topology information to the first network element, where the network topology information is used to determine an MEC access point to be accessed by a terminal group of the first service. The terminal group of the first service includes a terminal requesting the first service and/or a terminal subscribing to the first service.

According to the method for determining an MEC access point provided in this embodiment of this application, the third network element may obtain, based on an indication of the first network element, the network topology information of the plurality of MEC access points supporting the first service, and provide the network topology information for the first network element. The first network element selects, based on the network topology information, the MEC access point to be accessed by users in the terminal group. Because the network topology information reflects locations and a connection relationship of the MEC access points, when the MEC access point is determined based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

The sixth network element may be a session management network element or an operations administration maintenance (OAM) network element. The fifth information may be used to obtain the topology information of the MEC access points known to the sixth network element in the plurality of MEC access points included in the fifth information.

In a possible implementation, the identifiers of the plurality of MEC access points included in the second information may be the MEC access points respectively closest to the terminals in the terminal group.

It should be noted that the method for determining an MEC access point provided in the second aspect and the method for determining an MEC access point provided in the first aspect are a same solution described from different perspectives. For an example implementation, reference may be made to each other, and details are not described herein again.

According to a third aspect, another method for determining an MEC access point is provided, and the method may include: A fourth network element receives third information from a first network element, where the third information includes identifiers of a plurality of MEC access points, and the MEC access points support a first service. The fourth network element obtains network topology information of the plurality of MEC access points. The network topology information indicates whether at least two MEC access points are connected, and/or the network topology information indicates performance of a link between at least two MEC access points. The fourth network element determines, from the plurality of MEC access points according to a preset rule and the network topology information, a first MEC access point to be accessed by a terminal group of the first service. The fourth network element sends an identifier of the first MEC access point to the first network element. The terminal group of the first service includes a terminal requesting the first service and/or a terminal subscribing to the first service.

According to the method for determining an MEC access point provided in this embodiment of this application, the fourth network element first obtains, based on an indication of the first network element, the network topology information of the MEC access points supporting the first service, and then selects, based on the network topology information, the MEC access point to be accessed by users in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

In a possible implementation, the identifiers of the plurality of MEC access points included in the third information may be the MEC access points respectively closest to the terminals in the terminal group.

In another possible implementation, that the fourth network element obtains network topology information of the plurality of MEC access points may be implemented as follows: The fourth network element stores the network topology information, and the fourth network element reads the locally stored network topology information.

In another possible implementation, that the fourth network element obtains network topology information of the plurality of MEC access points may be implemented as follows: The fourth network element obtains a sixth network element corresponding to each MEC access point. The fourth network element sends fifth information to each sixth network element, where the fifth information includes the identifiers of the plurality of MEC access points. The fourth network element receives, from each sixth network element, topology information of MEC access points known to the sixth network element in the plurality of MEC access points, where the topology information is obtained based on the fifth information and indicates whether at least two MEC access points are connected, and/or the topology information indicates performance of a link between at least two MEC access points. The fourth network element aggregates the topology information to obtain the network topology information.

The fifth information may be used to obtain a topology of the MEC access points known to the sixth network element in the plurality of MEC access points.

In another possible implementation, the preset rule may include: determining the first MEC access point from the network topology information based on loads and/or delays of the MEC access points, so as to select the first MEC access point that meets an actual requirement and that can save network resources while improving user experience.

In another possible implementation, the sixth network element may be an operations administration maintenance network element or a session management network element.

It should be noted that the method for determining an MEC access point provided in the third aspect and the method for determining an MEC access point provided in the first aspect are a same solution described from different perspectives. For an example implementation, reference may be made to each other, and details are not described herein again.

According to a fourth aspect, a method for determining an MEC access point is provided, and the method may include: A fifth network element receives fourth information from a first network element, where the fourth information includes identifiers of terminals in a terminal group of a first service and identifiers of MEC access points supporting the first service. The fifth network element obtains a context of each terminal in the terminal group, where a context of a terminal includes network topology information of an access network element accessed by the terminal and the MEC access points supporting the first service. The network topology information indicates whether the access network element is connected to the MEC access points, and whether at least two MEC access points are connected; and/or the network topology information indicates performance of links between the access network element and the MEC access points, and between at least two MEC access points. The fifth network element determines, according to a preset rule and the network topology information in the context of each terminal, a first MEC access point to be accessed by the terminal group of the first service from the MEC access points supporting the first service. The fifth network element sends an identifier of the first MEC access point to the first network element.

The terminal group of the first service includes a terminal requesting the first service and/or a terminal subscribing to the first service.

According to the method for determining an MEC access point provided in this embodiment of this application, network topology information of access network elements accessed by the terminals in the terminal group and the MEC access points supporting the first service is first obtained, and then the MEC access point to be accessed by users in the terminal group is selected based on the network topology information. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

In a possible implementation, the preset rule may include: determining the first MEC access point from the network topology information based on loads and/or delays of the MEC access points, so as to select the first MEC access point that meets an actual requirement and that can save network resources while improving user experience.

In another possible implementation, that the fifth network element obtains a context of each terminal in the terminal group may be implemented as follows: The fifth network element obtains the context of each terminal by querying a data storage function. Alternatively, the fifth network element queries, from a unified data management platform, session management network elements corresponding to terminals other than a terminal corresponding to the fifth network element. The fifth network element separately obtains, from the session management network elements corresponding to the terminals, contexts of the terminals other than the terminal corresponding to the fifth network element.

It should be noted that the method for determining an MEC access point provided in the fourth aspect and the method for determining an MEC access point provided in the first aspect are a same solution described from different perspectives. For an example implementation, reference may be made to each other, and details are not described herein again.

According to a fifth aspect, a method for determining an MEC access point is provided, and the method may include: A first network element obtains identifiers of MEC access points respectively closest to terminals in a terminal group of a first service, where the MEC access points support the first service. The terminal group of the first service includes a terminal requesting the first service and/or a terminal subscribing to the first service. The first network element sends second information to a third network element, where the second information includes the identifiers of the MEC access points respectively closest to the terminals. The third network element receives the second information from the first network element. The third network element determines, based on the second information, network topology information of the MEC access points respectively closest to the terminals, where the network topology information indicates whether at least two MEC access points are connected, and/or the network topology information indicates performance of a link between at least two MEC access points. The third network element sends the network topology information to the first network element. The first network element receives, from the third network element, the network topology information obtained based on the second information. The first network element determines, according to a preset rule and the network topology information, a first MEC access point to be accessed by the terminal group from the MEC access points respectively closest to the terminals.

According to the method for determining an MEC access point provided in this embodiment of this application, the third network element may obtain, based on an indication of the first network element, the network topology information of the plurality of MEC access points supporting the first service, and provide the network topology information for the first network element. The first network element selects, based on the network topology information, the MEC access point to be accessed by users in the terminal group. Because the network topology information reflects locations and a connection relationship of the MEC access points, when the MEC access point is determined based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

It should be noted that the method for determining an MEC access point provided in the fifth aspect and the methods for determining an MEC access point provided in the first aspect and the second aspect are a same solution described from different perspectives. For an example implementation, reference may be made to each other, and details are not described herein again.

According to a sixth aspect, a method for determining an MEC access point is provided, and the method may include: A first network element obtains identifiers of MEC access points closest to terminals in a terminal group of a first service, where the MEC access points support the first service. The terminal group of the first service includes a terminal requesting the first service and/or a terminal subscribing to the first service. The first network element sends third information to a fourth network element, where the third information includes identifiers of the MEC access points respectively closest to the terminals. The fourth network element receives the third information from the first network element. The fourth network element obtains network topology information of the MEC access points respectively closest to the terminals, where the network topology information indicates whether at least two MEC access points are connected, and/or the network topology information indicates performance of a link between at least two MEC access points. The fourth network element determines, according to a preset rule and the network topology information, a first MEC access point to be accessed by the terminal group from the MEC access points respectively closest to the terminals. The fourth network element sends an identifier of the first MEC access point to the first network element. The first network element receives, from the fourth network element, the identifier of the first MEC access point that is determined based on the third information.

According to the method for determining an MEC access point provided in this embodiment of this application, the fourth network element first obtains, based on an indication of the first network element, the network topology information of the MEC access points supporting the first service, and then selects, based on the network topology information, the MEC access point to be accessed by users in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

It should be noted that the method for determining an MEC access point provided in the sixth aspect and the methods for determining an MEC access point provided in the first aspect and the third aspect are a same solution described from different perspectives. For an example implementation, reference may be made to each other, and details are not described herein again.

According to a seventh aspect, a method for determining an MEC access point is provided, and the method may include: A first network element sends fourth information to a fifth network element, where the fourth information includes an identifier of each terminal in a terminal group of a first service and identifiers of MEC access points supporting the first service. The terminal group of the first service includes a terminal requesting the first service and/or a terminal subscribing to the first service. The fifth network element receives the fourth information from the first network element. The fifth network element obtains a context of each terminal in the terminal group, where a context of a terminal includes network topology information of an access network element accessed by the terminal and the MEC access points supporting the first service, and the network topology information indicates whether the access network element is connected to the MEC access points, and whether at least two MEC access points are connected; and/or the network topology information indicates performance of links between the access network element and the MEC access points, and between at least two MEC access points. The fifth network element determines, according to a preset rule and the network topology information in the context of each terminal, a first MEC access point to be accessed by the terminal group of the first service from the MEC access points supporting the first service. The fifth network element sends an identifier of the first MEC access point to the first network element. The first network element receives, from the fifth network element, the identifier of the first MEC access point that is determined based on the fourth information.

According to the method for determining an MEC access point provided in this embodiment of this application, the fifth network element obtains, based on an indication of the first network element, the network topology information of the access network element accessed by the terminal in the terminal group and the MEC access points supporting the first service, and then selects, based on the network topology information, the MEC access point to be accessed by users in the terminal group. Because the network topology information reflects locations and a connection relationship of the MEC access points, when the MEC access point is selected based on the network topology information of the MEC access points, actual locations of the terminals in the terminal group may be considered. In this way, a path of the MEC access point selected for the users in the terminal group is optimal for the users in the terminal group, and network resources are saved on a premise of improving user experience.

It should be noted that the method for determining an MEC access point provided in the seventh aspect and the methods for determining an MEC access point provided in the first aspect and the fourth aspect are a same solution described from different perspectives. For an example implementation, reference may be made to each other, and details are not described herein again.

According to an eighth aspect, an apparatus for determining an MEC access point is provided, and the apparatus may include: an obtaining unit and a sending unit.

The obtaining unit is configured to obtain a first MEC access point to be accessed by a terminal group of a first service, where the first MEC access point is obtained based on at least network topology information of MEC access points that are respectively closest to all terminals in the terminal group and that support the first service. The network topology information indicates whether at least two MEC access points are connected, and/or the network topology information indicates performance of a link between at least two MEC access points. The terminal group of the first service includes a terminal requesting the first service and/or a terminal subscribing to the first service.

The sending unit is configured to send an identifier of the first MEC access point obtained by the obtaining unit to a session management network element that controls each of the terminals, where the identifier of the first MEC access point is used for each of the terminals to access the first MEC access point.

According to the apparatus for determining an MEC access point provided in this embodiment of this application, the MEC access point to be accessed by users in the terminal group is determined based on the network topology information of the MEC access points respectively closest to the terminals in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

In a possible implementation, the apparatus may be an AF network element or an NEF.

In a possible implementation, the obtaining unit is configured to: send first information to a second network element corresponding to each terminal in the terminal group of the first service, where the first information includes identifiers of the MEC access points supporting the first service and an identifier of a terminal managed by the second network element in the terminal group; receive, from each of the second network elements, an identifier of an MEC access point closest to each of the terminals that is determined based on the first information; send second information to a third network element, where the second information includes the identifier of the MEC access point closest to each of the terminals; receive, from the third network element, the network topology information obtained based on the second information; and determine, according to a preset rule and the network topology information, the first MEC access point from the MEC access points respectively closest to the terminals. The apparatus obtains the MEC access points respectively closest to the terminals in the terminal group, and then obtains the network topology information of the MEC access points respectively closest to the terminals. Then, the first network element determines the first MEC access point based on the obtained network topology information. In this way, network resources are saved while user experience is improved. The execution entity of the solution is effectively and flexibly designed, and application scenarios are expanded.

The second network element may be a session management network element. The first information may be used to obtain an MEC access point closest to each terminal included in the first information. The second information may be used to obtain the network topology information of the MEC access points respectively closest to the terminals.

In another possible implementation, the obtaining unit is configured to: send first information to a second network element corresponding to each terminal in the terminal group, where the first information includes identifiers of the MEC access points supporting the first service and an identifier of a terminal managed by the second network element in the terminal group; receive, from each second network element, an MEC access point closest to each terminal in the terminal group that is determined based on the first information; send third information to a fourth network element, where the third information includes an identifier of the MEC access point closest to each terminal in the terminal group; and receive, from the fourth network element, the identifier of the first MEC access point that is determined based on the third information. The apparatus obtains the MEC access point closest to each terminal in the terminal group, and then the apparatus provides the identifier of the MEC access point closest to each terminal in the terminal group to the fourth network element, and the fourth network element determines the first MEC access point and feeds back the first MEC access point to the first network element. In this way, network resources are saved while user experience is improved. The execution entity of the solution is effectively and flexibly designed, and application scenarios are expanded.

The fourth network element may be a session management network element or an ECS. The third information is used to determine the first MEC access point to be accessed by the terminal group of the first service.

In another possible implementation, the obtaining unit is configured to: send fourth information to a fifth network element, where the fourth information includes an identifier of each terminal in the terminal group and identifiers of the MEC access points supporting the first service; and receive, from the fifth network element, the identifier of the first MEC access point that is determined based on the fourth information. The fifth network element selects the first MEC access point, so as to save network resources on a premise of improving user experience. In addition, the execution entity of the solution is effectively and flexibly designed, and application scenarios are expanded.

The fifth network element may be a session management network element. The fourth information may be used to indicate to select the first MEC access point.

In another possible implementation, the preset rule may include: determining the first MEC access point from the network topology information based on loads and/or delays of the MEC access points, so as to select the first MEC access point that meets an actual requirement and that can save network resources while improving user experience.

It should be noted that the apparatus for determining an MEC access point provided in the eighth aspect is configured to perform the method for determining an MEC access point provided in the first aspect. For an example implementation, refer to the example implementation of the first aspect. A same effect as that of the first aspect may be achieved.

According to a ninth aspect, an apparatus for determining an MEC access point is provided, and the apparatus may include: a receiving unit, an obtaining unit, an aggregation unit, and a sending unit.

The receiving unit is configured to receive second information from a first network element, where the second information includes identifiers of a plurality of MEC access points, and the MEC access points support a first service.

The obtaining unit is configured to obtain a sixth network element corresponding to each MEC access point of the plurality of MEC access points included in the second information.

The sending unit is configured to send fifth information to each sixth network element, where the fifth information includes the identifiers of the plurality of MEC access points in the second information.

The receiving unit is further configured to receive, from each sixth network element, topology information of MEC access points known to the sixth network element in the plurality of MEC access points, where the topology information is obtained based on the fifth information and indicates whether at least two MEC access points are connected, and/or the topology information indicates performance of a link between at least two MEC access points.

The aggregation unit is configured to aggregate the received topology information to obtain the network topology information.

The sending unit is further configured to send the network topology information to the first network element, where the network topology information is used to determine an MEC access point to be accessed by a terminal group of the first service. The terminal group of the first service includes a terminal requesting the first service and/or a terminal subscribing to the first service.

According to the apparatus for determining an MEC access point provided in this embodiment of this application, the network topology information of the plurality of MEC access points supporting the first service may be obtained based on an indication of the first network element, and the network topology information is provided for the first network element. The first network element selects, based on the network topology information, the MEC access point to be accessed by users in the terminal group. Because the network topology information reflects locations and a connection relationship of the MEC access points, when the MEC access point is determined based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

It should be noted that the apparatus for determining an MEC access point provided in the ninth aspect is configured to perform the method for determining an MEC access point provided in the second aspect. For an example implementation, refer to the example implementation of the second aspect. A same effect as that of the second aspect may be achieved.

According to a tenth aspect, an apparatus for determining an MEC access point is provided, and the apparatus may include: a receiving unit, an obtaining unit, a determining unit, and a sending unit.

The receiving unit is configured to receive third information from a first network element, where the third information includes identifiers of a plurality of MEC access points, and the MEC access points support a first service.

The obtaining unit is configured to obtain network topology information of the plurality of MEC access points. The network topology information indicates whether at least two MEC access points are connected, and/or the network topology information indicates performance of a link between at least two MEC access points.

The determining unit is configured to determine, from the plurality of MEC access points according to a preset rule and the network topology information, a first MEC access point to be accessed by a terminal group of the first service. The terminal group of the first service includes a terminal requesting the first service and/or a terminal subscribing to the first service.

The sending unit is configured to send an identifier of the first MEC access point to the first network element.

According to the apparatus for determining an MEC access point provided in this embodiment of this application, the apparatus first obtains, based on an indication of the first network element, the network topology information of the MEC access points supporting the first service, and then selects, based on the network topology information, the MEC access point to be accessed by users in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

In a possible implementation, the obtaining unit is configured to: the apparatus stores the network topology information, and the obtaining unit only needs to read the locally stored network topology information.

In another possible implementation, the obtaining unit is configured to: obtain a sixth network element corresponding to each MEC access point; send fifth information to each sixth network element, where the fifth information includes the identifiers of the plurality of MEC access points; receive, from each of the sixth network elements, topology information of MEC access points known to the sixth network element in the plurality of MEC access points, where the topology information is obtained based on the fifth information and indicates whether at least two MEC access points are connected, and/or the topology information indicates performance of a link between at least two MEC access points; and aggregate the topology information to obtain the network topology information.

The fifth information may be used to obtain a topology of the MEC access points known to the sixth network element in the plurality of MEC access points.

In another possible implementation, the preset rule may include: determining the first MEC access point from the network topology information based on loads and/or delays of the MEC access points, so as to select the first MEC access point that meets an actual requirement and that can save network resources while improving user experience.

In another possible implementation, the sixth network element may be an operations administration maintenance network element or a session management network element.

It should be noted that the apparatus for determining an MEC access point provided in the tenth aspect is configured to perform the method for determining an MEC access point provided in the third aspect. For an example implementation, refer to the example implementation of the third aspect. A same effect as that of the third aspect may be achieved.

According to an eleventh aspect, an apparatus for determining an MEC access point is provided, and the apparatus may include: a receiving unit, an obtaining unit, a determining unit, and a sending unit.

The receiving unit is configured to receive fourth information from a first network element, where the fourth information includes identifiers of terminals in a terminal group of a first service and identifiers of MEC access points supporting the first service.

The obtaining unit is configured to obtain a context of each terminal in the terminal group, where a context of a terminal includes network topology information of an access network element accessed by the terminal and the MEC access points supporting the first service. The network topology information indicates whether the access network element is connected to the MEC access points, and whether at least two MEC access points are connected; and/or the network topology information indicates performance of links between the access network element and the MEC access points, and between at least two MEC access points.

The determining unit is configured to determine, according to a preset rule and the network topology information in the context of each terminal, a first MEC access point to be accessed by the terminal group of the first service from the MEC access points supporting the first service. The terminal group of the first service includes a terminal requesting the first service and/or a terminal subscribing to the first service.

The sending unit is configured to send an identifier of the first MEC access point to the first network element.

According to the apparatus for determining an MEC access point provided in this embodiment of this application, network topology information of access network elements accessed by the terminals in the terminal group and the MEC access points supporting the first service is first obtained, and then the MEC access point to be accessed by users in the terminal group is selected based on the network topology information. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

In a possible implementation, the preset rule may include: determining the first MEC access point from the network topology information based on loads and/or delays of the MEC access points, so as to select the first MEC access point that meets an actual requirement and that can save network resources while improving user experience.

In another possible implementation, the obtaining unit is configured to: obtain the context of each terminal by querying a data storage function; or query, from a unified data management platform, session management network elements corresponding to terminals other than a terminal corresponding to the apparatus; and separately obtain, from the session management network elements corresponding to the terminals, contexts of the terminals other than the terminal corresponding to the apparatus.

It should be noted that the apparatus for determining an MEC access point provided in the eleventh aspect is configured to perform the method for determining an MEC access point provided in the fourth aspect. For an example implementation, refer to the example implementation of the fourth aspect. A same effect as that of the fourth aspect may be achieved.

According to a twelfth aspect, a communication device is provided, where the communication device includes: a processor and a memory. The memory is connected to the processor. The memory is configured to store computer instructions. When the processor executes the computer instructions, the communication device is enabled to perform the method for determining an MEC access point provided in any one of the foregoing aspects or the possible implementations.

According to a thirteenth aspect, a communication device is provided. The communication device may implement the functions in the method example described in any one of the foregoing aspects. The functions may be implemented by hardware, or may be implemented by hardware executing corresponding software. The hardware or software includes one or more modules corresponding to the foregoing functions. The communication device may exist in a product form of a chip.

In a possible implementation, the communication device may include a processor and a transmission interface. The transmission interface is configured to receive and send data. The processor is configured to invoke a program instruction stored in the memory, so that the communication device performs the functions in the method example described in any one of the foregoing aspects.

According to a fourteenth aspect, a communication system is provided. The system may include a first communication device, and the first communication device is configured to perform the method for determining an MEC access point provided in the first aspect.

In a possible implementation, the system may further include one or more of a second communication device, a third communication device, and a fourth communication device. The second communication device is configured to perform the method for determining an MEC access point provided in the second aspect. The third communication device is configured to perform the method for determining an MEC access point provided in the third aspect, and the fourth communication device is configured to perform the method for determining an MEC access point provided in the fourth aspect.

According to a fifteenth aspect, a computer-readable storage medium is provided, including instructions. When the instructions are run on a computer, the computer is enabled to perform the method for determining an MEC access point according to any one of the foregoing aspects or any one of the possible implementations.

According to a sixteenth aspect, a computer program product is provided. When the computer program product runs on a computer, the computer is enabled to perform the method for determining an MEC access point according to any one of the foregoing aspects or any one of the possible implementations.

According to a seventeenth aspect, a chip system is provided. The chip system includes a processor, may further include a memory, and is configured to implement the functions performed by the first network element, the third network element, the fourth network element, or the fifth network element in the foregoing method. The chip system may include a chip, or may include a chip and another discrete component.

The solutions provided in the twelfth aspect to the seventeenth aspect are used to implement the method for determining an MEC access point provided in the first aspect to the seventh aspect, and therefore can achieve the same beneficial effects as those in the first aspect to the seventh aspect. Details are not described herein again.

It should be noted that all possible implementations of any one of the foregoing aspects may be combined on a premise that there is no conflict between the solutions.

BRIEF DESCRIPTION OF DRAWINGS

FIG. 3 is a schematic diagram of a structure of a communication device according to an embodiment of this application;

FIG. 4 is a schematic flowchart of a method for determining an MEC access point according to an embodiment of this application;

FIG. 5A and FIG. 5B are a schematic flowchart of another method for determining an MEC access point according to an embodiment of this application;

DESCRIPTION OF EMBODIMENTS

Figure 1A:
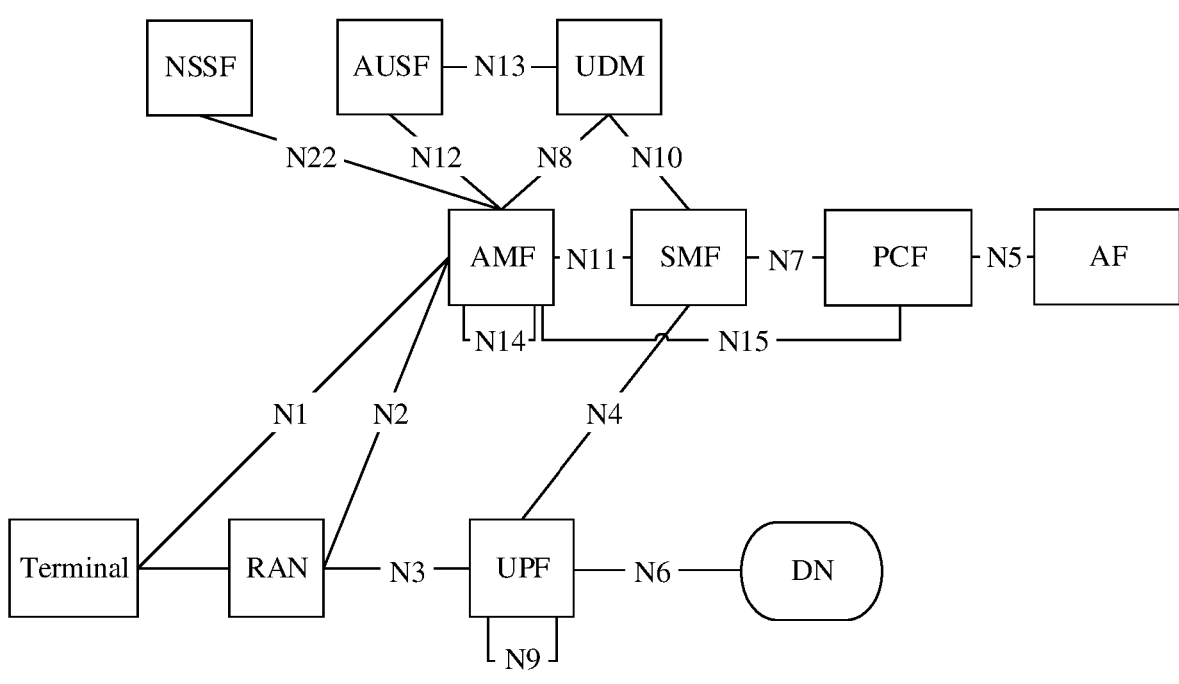
FIG. 1a is a schematic diagram of an architecture of a communication system according to an embodiment of this application.

In embodiments of this application, to clearly describe the technical solutions in embodiments of this application, terms such as "first" and "second" are used to distinguish between same items or similar items that have basically same functions and purposes. A person skilled in the art may understand that the terms such as "first" and "second" do not limit a quantity or an execution sequence, and the terms such as "first" and "second" do not indicate a definite difference. There is no sequence or magnitude order between technical features described by "first" and "second".

The term "example" or "for example" in embodiments of this application means "used as an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a relative concept in a specific manner for ease of understanding.

In the descriptions of this application, unless otherwise specified, "/" indicates that associated objects are in an "or" relationship. For example, A/B may represent A or B. The term "and/or" in this specification describes only an association relationship for describing associated objects and represents that three relationships may exist. For example, A and/or B may represent the following three cases: Only A exists, both A and B exist, and only B exists. A and B each may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c each may be singular or plural.

In embodiments of this application, "at least one" may alternatively be described as one or more, and "more" may be two, three, four, or more. This is not limited in this application.

It should be noted that for "A sends content to B" described in this application, when A and B are not directly connected in a network architecture, the content may be forwarded level by level by network elements between A and B, so that the content reaches B. This is uniformly described as "A sends the content to B" in this specification.

The network architecture and the scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Before embodiments of this application are described, terms in this application are first explained and described in a unified manner herein, and are not described one by one later.

An MEC server may be a platform server that provides an MEC service. One MEC server may run one or more specific tasks, and the specific tasks are used to provide corresponding services for a user. The MEC server is a platform that is deployed locally and provides a service for a user. The MEC server may be deployed in a local device in a core network, for example, deployed in a user plane function (UPF) network element.

A DNAI refers to an access network entity where the MEC server that provides a service is located. One MEC server corresponds to one or more DNAIs, and a quantity of DNAIs corresponding to an MEC server is related to a service type provided by the MEC server. One DNAI is corresponding to (or associated with) at least one UPF, and is used to identify a data network (DN) of an application server.

An MEC access point indicates a local device that provides an MEC service for a user. The MEC access point may be a DNAI accessed by the user, or the MEC access point may be corresponding to the DNAI accessed by the user. For example, the MEC access point may be a DNAI accessed by the user, or a UPF corresponding to the DNAI accessed by the user.

The method provided in embodiments of this application is applied to any communication system. The communication system may be a 3rd generation partnership project (3GPP) communication system, for example, a long term evolution (LTE) system, or may be a 5G mobile communication system or a new radio (NR) system, or may be a non-3GPP communication system. This is not limited.

As shown in FIG. 1a, an architecture diagram of a communication system is provided. The communication system may include a terminal, a (radio) access network ((R)AN) device, a core network, a DN, and the like. The access network device is configured to implement functions related to radio access. The terminal accesses the core network and the DN through the access network device, to complete service data interaction.

In FIG. 1a, an example in which the core network and the access network are 5th generation (5G) mobile communication networks is used for description. Refer to FIG. 1a. Core network devices may include an access and mobility management function AMF), a session management function (SMF), a UPF, a unified data management (UDM) network element, a policy control function (PCF), an application function (AF), an authentication server function (AUSF), and a network slice selection function (NSSF). The following describes the communication system in this application with reference to FIG. 1a.

The terminal may be referred to as UE or terminal equipment. Apparently, the terminal shown in FIG. 1a may include but is not limited to an in-vehicle terminal, a mobile phone, Internet of Things terminal equipment, a tablet computer or a computer with a wireless transceiver function, a smart gas station, a smart signal lamp, or the like.

The (R)AN is a device that provides radio access for the terminal, and may be referred to as an access network device. The 5G-RAN is connected to the UPF through a user plane interface N3, and is configured to transmit data of the terminal equipment. The 5G-RAN establishes a control plane signaling connection to the AMF through a control plane interface N2 to implement functions such as radio access bearer control. For example, the access network device may be a base station, a broadband network gateway (BNG), an aggregation switch, a non-3GPP access device, or the like. The base station may include base stations in various forms, for example, a macro base station, a micro base station (also referred to as a small cell), a relay station, an access point, or the like. This is not limited in embodiments of this application. A device through which the terminal accesses the core network is collectively referred to as an access network device in this specification, and is not described again. For example, the access network device may be an evolved universal terrestrial radio access network (E-UTRAN) device in a 4th generation (4G) mobile communication technology network, a next generation radio access network (NG-RAN) device in the 5G network, an evolved NodeB (eNodeB), a Wi-Fi access point (AP), a world interoperability for microwave access (WiMAX) base station (BS), or the like.

The AMF is mainly responsible for mobility management in a mobile network, such as user location update, user network registration, and user handover. Main functions of the AMF include terminal authentication, terminal mobility management, network slice selection, SMF selection, and the like. The AMF serves as an anchor for the N1 and N2 signaling connections and provides routes for the SMF to route an N1/N2 SM message; and maintains and manages UE status information.

The SMF is mainly responsible for all control-plane functions of terminal session management in the mobile network, such as session establishment, modification, and release. Specific functions are, for example, selecting a UPF to provide a packet forwarding function, internet protocol (IP) address allocation, and quality of service (QoS) management of a session.

As an anchor for a protocol data unit (PDU) session connection, the UPF is mainly responsible for data packet filtering for user equipment, data transmission/forwarding, rate control, charging information generation, and the like.

The UDM network element mainly manages and controls user data, for example, manages subscription information, including obtaining subscription information from a unified data repository (UDR) and providing the subscription information to another network element (for example, the AMF); generates a 3GPP authentication credential for the terminal; and registers and maintains a network element that currently serves the terminal.

The UDR network element is mainly used to store user data, including the subscription data invoked by the UDM.

The DN is a network that provides a user with a data transmission service, for example, an IP multimedia subsystem (IMS) or an Internet network.

The AF is responsible for providing a service to a 3GPP network, for example, affecting service routing or interacting with the PCF for policy control.

In the communication system illustrated in FIG. 1a, the terminal accesses the DN by establishing a session and a user plane connection from the terminal to the (R)AN to the UPF to the DN.

It should be noted that a network formed by operator network elements other than the (R)AN may be referred to as a core network. In a 5G network, the core network includes network elements such as an AMF, an SMF, and a UPF. In FIG. 1a, the 5G network is merely used as an example, but does not constitute a specific limitation on core network elements.

It should be noted that a network architecture to which embodiments of this application are applied is not limited to the network architecture shown in FIG. 1a. In addition, the network architecture shown in FIG. 1a is merely an example architecture diagram, and neither a quantity of network elements included in the communication system nor names of the network elements are limited. For example, in addition to the network function entities shown in FIG. 1a, the network shown in FIG. 1a may further include another function entity.

It should be noted that a network architecture to which embodiments of this application are applied is not limited to the network architecture shown in FIG. 1a. In addition, the network architecture shown in FIG. 1a is merely an example architecture diagram, and neither a quantity of network elements included in the communication system nor names of the network elements are limited. For example, in addition to the network function entities shown in FIG. 1a, the network shown in FIG. 1a may further include another function entity. For another example, the network elements, names of the interfaces between the network elements, and a name of each protocol layer in the architecture in FIG. 1a are merely examples. In an example implementation, the network elements, the interfaces between the network elements, and the protocol layer may have other names. This is not specifically limited in embodiments of this application.

In a network architecture in which MEC is deployed, a DNAI change procedure is triggered in many cases. Then, a core network selects an MEC access point (added or changed) of a terminal, and adds a UPF corresponding to the selected MEC access point as an uplink classifier (ULCL) to connect to a local server, and the selected MEC access point provides an MEC service for the terminal.

Currently, with reference to 3GPP 23.502, the DNAI change procedure in the MEC scenario is mainly implemented in the following three procedures: a data routing procedure, a ULCL addition procedure, and a notification procedure.

In the data routing procedure, information such as a DNAI that supports an MEC service, a corresponding location area, and a service flow is notified to a core network device. For example, for the data routing procedure, refer to the AF influence traffic routing procedure in 5G that is defined in 3GPP 23.502. An AF uses the information such as the DNAI that supports the MEC service, the corresponding location area, and the service flow as a rule, and delivers the rule to an SMF through a PCF.

Figure 1B:
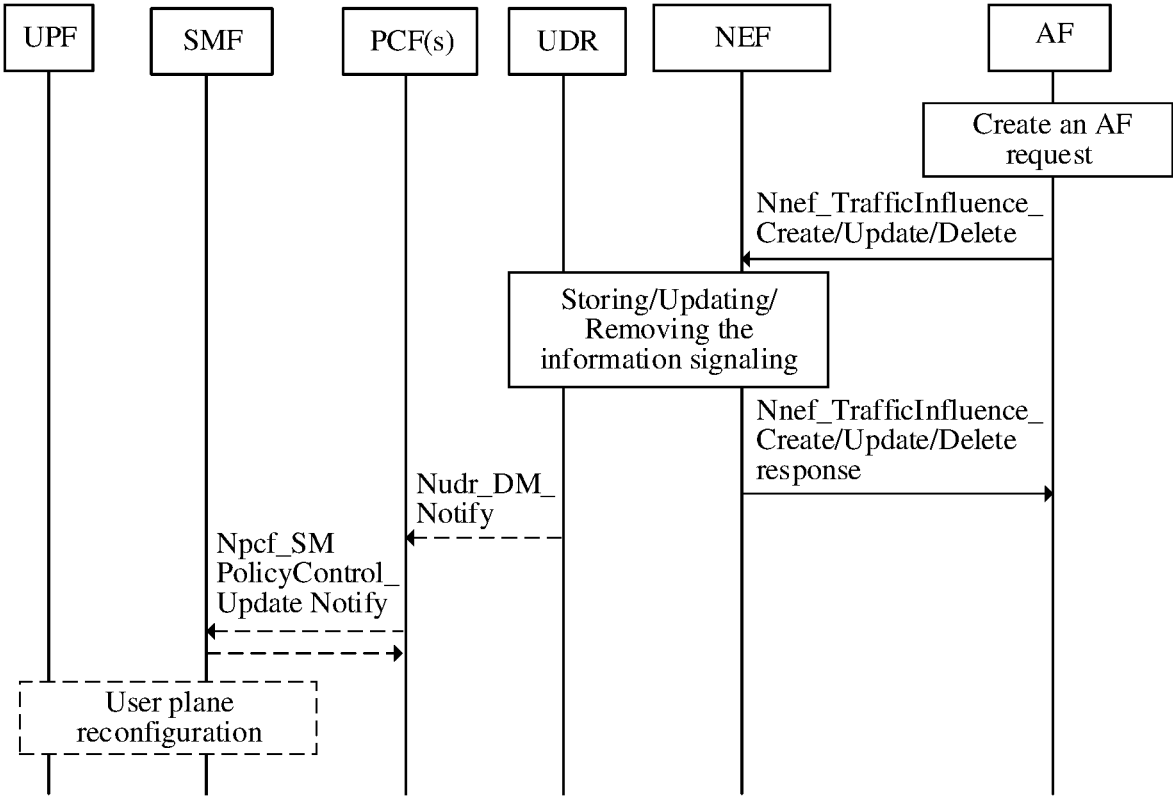
FIG. 1b is a schematic diagram of an AF influence traffic routing procedure according to an embodiment of this application.

For example, the AF influence traffic routing procedure may be shown in FIG. 1B. The AF first creates an AF request (carrying the information such as the DNAI that supports the MEC service, the corresponding location area, and the service flow). Then, the AF sends the request to an NEF using Nnef_TrafficInfluence_Create/Update/Delete signaling. The NEF sends the request to a UDR using Storing/Updating/Removing the information signaling and stores the request in the UDR. The NEF feeds back an Nnef_TrafficInfluence_Create/Update/Delete response to the AF. After receiving the request, the UDR delivers the request to the PCF using Nudr_DM_Notify. The PCF notifies the SMF of the corresponding PCC rule using Npcf_SM_PolicyControl_Update Notify. Then, the SMF may select an MEC access point to complete user plane reconfiguration The ULCL addition procedure is to trigger the data routing procedure based on an actual network status, then select an MEC access point, and add a ULCL to implement uplink traffic steering. For the ULCL addition procedure, refer to the procedure of the addition of ULCL defined in 3GPP 23.502. The SMF determines, based on an area change or detection of the corresponding service flow, to execute the rule delivered in the AF influence traffic routing procedure, selects an MEC access point, and adds a ULCL. In the ULCL addition procedure, the SMF separately adjusts ULCL forwarding rules of a PDU session anchor (PSA) 1 (an original PSA) and a PSA 2 (a newly added PSA), to ensure that corresponding uplink and downlink data packets are transmitted from correct user plane network elements.

Figure 1C:
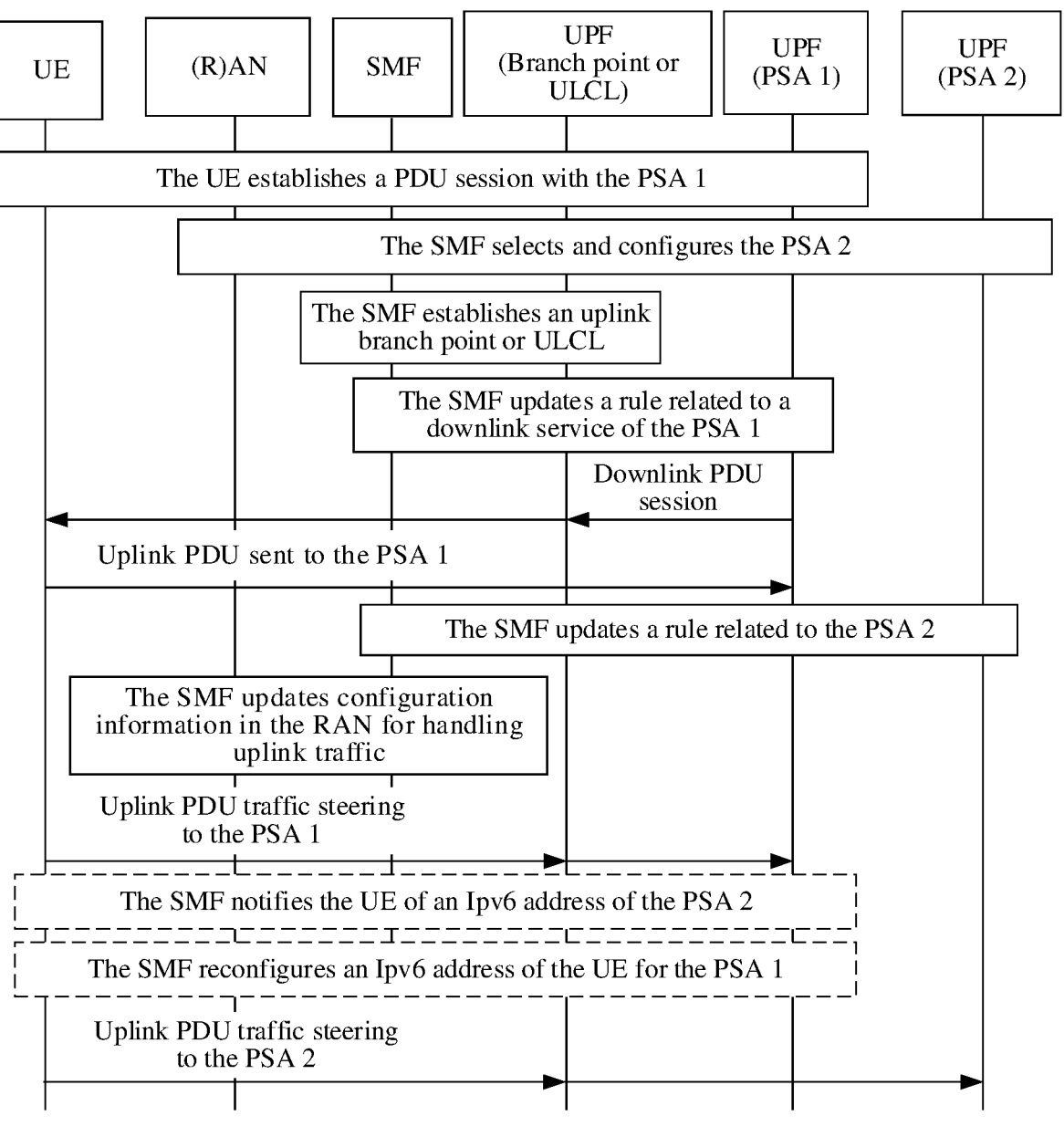
FIG. 1c is a schematic diagram of a ULCL addition procedure according to an embodiment of this application.

For example, FIG. 1c illustrates a ULCL addition procedure. As shown in FIG. 1c, after UE establishes a PDU session with a PSA 1, an SMF determines, based on an area change or detection of a corresponding service flow, to execute the rule delivered in the process in FIG. 1B, and adds a ULCL. The SMF selects a PSA 2 and configures related information, and adds a branch point or a ULCL to implement a ULCL function. The ULCL function is to forward uplink traffic to different PDU session anchors based on a filter requirement and combine downlink data of a plurality of anchors of the UE. The SMF updates a rule related to a downlink service of the PSA 1, so that the downlink traffic of the plurality of anchors of the UE is combined into the ULCL for transmission to the UE. In this case, uplink traffic of the UE is sent through the PSA 1. Next, the SMF updates an uplink traffic rule related to the PSA 2, so that the uplink traffic of the UE is forwarded to different PDU session anchors based on a filter requirement. The SMF further updates uplink traffic configuration information in an (R)AN, so that the uplink traffic of the UE is sent to the ULCL. In this case, the uplink traffic of the UE is sent to the PSA 1 through the ULCL. Optionally, if the session uses an internet protocol version 6 (IPv6) address, the SMF notifies the UE of an IPv6 address of the PSA 2, and the SMF reconfigures an IPv6 address of the UE for the PSA 1. After the uplink traffic of the UE reaches the ULCL, the uplink traffic may be forwarded to the PSA 2 based on a filter requirement.

In the notification procedure, the core network device notifies the AF of a DNAI change status, and the AF feeds back an AF notification response to the core network device. The AF notification response includes a configuration option of an N6 connection, and is used by the core network device to configure an N6 connection between the ULCL or the local PSA and an MEC server (if the local PSA and the MEC server are integrated or the N6 connection is preconfigured, the AF may not need to feed back the AF notification response). For the notification procedure, refer to the notification procedure (AF notification procedure) defined in 3GPP 23.502.

Figure 1D:
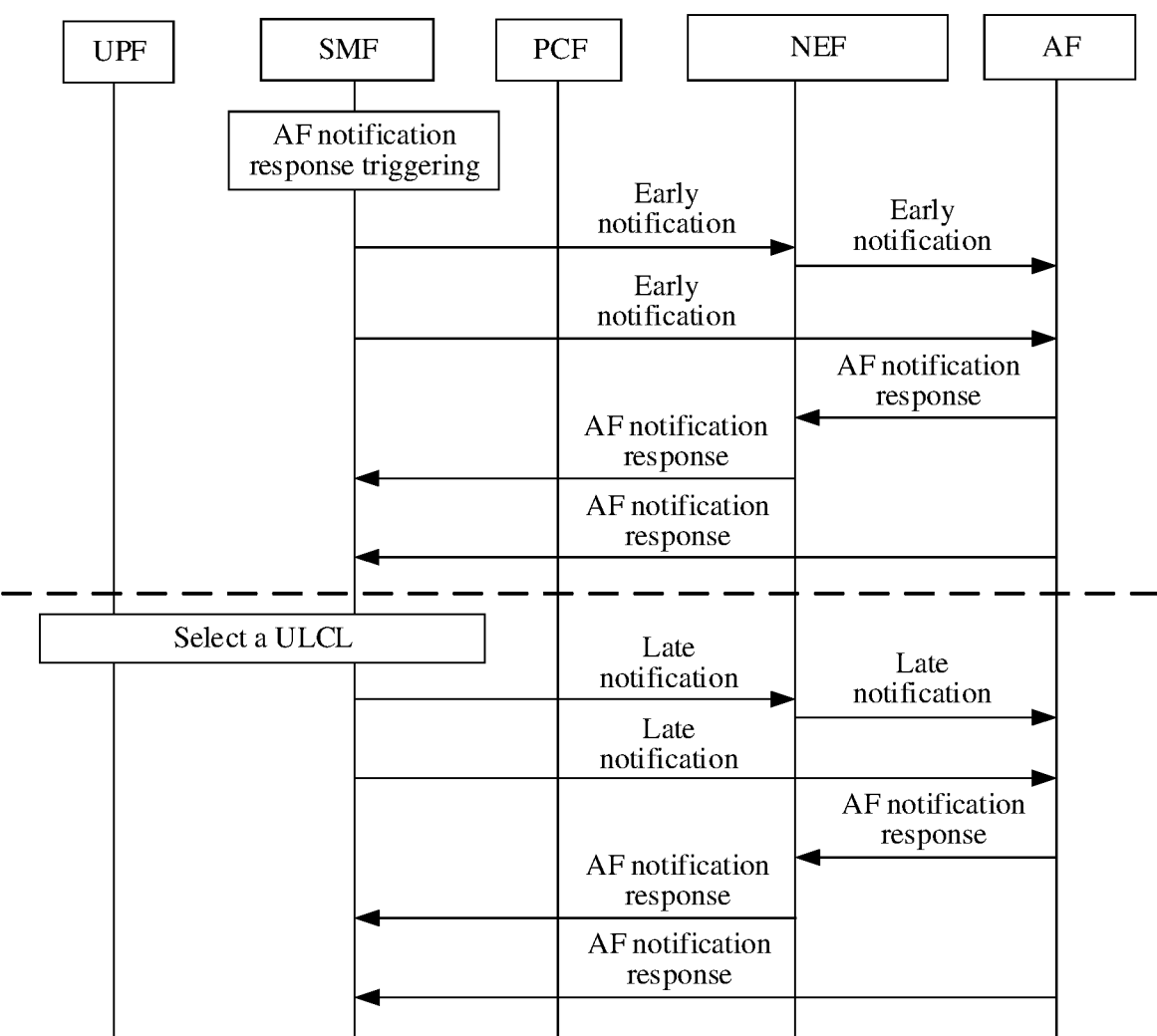
FIG. 1d is a schematic diagram of an AF notification procedure according to an embodiment of this application.

For example, FIG. 1*d* shows an AF notification procedure, which may be divided into early notification and late notification, and a main function is that after the SMF adds the ULCL, the SMF notifies the AF of a DNAI change status. The early notification and the late notification correspond to the two steps in FIG. 1*d* respectively: the SMF selects a PSA 2 and configures related information; and the SMF adds a branch point or a ULCL. If early notification is required, as shown in the part above the dotted line in FIG. 1*d*, the SMF sends an early notification message to the AF after selecting a new PSA, waits for the AF to feed back an AF notification response that includes an N6 configuration message, and then configures the new PSA. The early notification may be sent using Nsmf_EventExposure_Notify, and the AF notification response may be sent using Nsmf_EventExposure AppRelocatingInfo. If late notification is required, the SMF first sends a late notification message after the ULCL is selected. The SMF starts to configure the ULCL after the AF feeds back an AF notification response, where the notification response includes a routing rule for a data packet to be routed to the new PSA. The late notification may be sent using Nsmf_EventExposure_Notify, and the AF notification response may be sent using Nsmf_EventExposure AppRelocatingInfo. As shown in FIG. 1*d*, an interaction process between the SMF and the AF may be directly performed, or may be implemented through forwarding by the NEF. This is not limited in this embodiment of this application.

In an example, a case in which the core network is triggered to select an MEC access point of the terminal may include:

1. The terminal arrives at a specific tracking area (TA) due to mobility. After detecting the behavior, the core network triggers a DNAI change procedure and adds a ULCL to connect to the local server.
2. The terminal sends a data flow of a specific application (APP) in a specific TA. After detecting the behavior, the core network device triggers a DNAI change procedure and adds a ULCL to connect to the local server.
3. When performing a new service request, the terminal first sends a domain name system (DNS) request to query a server address corresponding to the service. After receiving the DNS request, the core network device triggers a DNAI change procedure and adds a ULCL to connect to the local server, and feeds back the address of the MEC server to the terminal. The terminal directly establishes a connection to the MEC server to perform a corresponding service.

Figures 1E, 2:
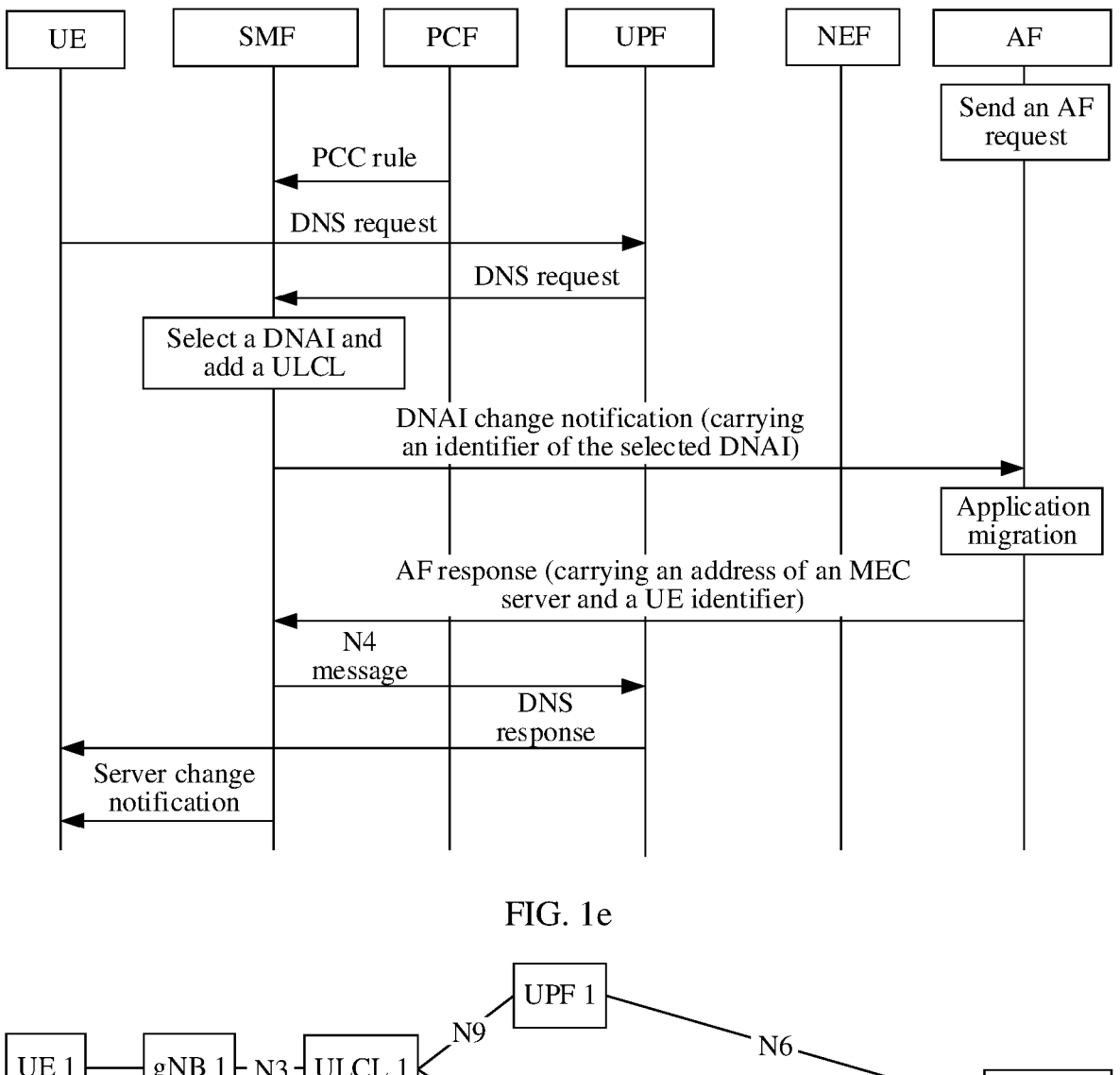
FIG. 1e is a schematic diagram of a DNAI change triggering procedure according to an embodiment of this application.
FIG. 2 is a schematic diagram of a system architecture of a game scenario according to an embodiment of this application.

As shown in FIG. 1*e*, triggering a DNAI change procedure when the terminal performs a new service request may include the following steps. When UE performs a new service request, the UE sends a DNS request to a UPF to query a corresponding server address. The UPF reports the DNS request to an SMF. The SMF triggers a DNAI change, selects a DNAI, adds a ULCL, and notifies an AF of a DNAI change status carrying an identifier of the selected DNAI. The AF performs application configuration and sends, to the SMF, an AF response (carrying a UE identifier and an address of an MEC server that is corresponding to the selected DNAI). The SMF sends, via an N4 message, a response message for the DNS request to the UPF. The SMF feeds back, via a server change notification, the address of the MEC server corresponding to the selected DNAI to the UE, and the UE directly establishes a connection to the MEC server to perform a corresponding service. In this example, the corresponding service is initiated by the UE and the DNS query request is to be sent.

Certainly, other cases of triggering the DNAI change procedure may also be included, and are not listed one by one herein.

According to the foregoing DNAI change procedure, in the MEC scenario, the connection and path adjustment of the MEC server are mainly implemented by the AF influence traffic routing procedure. The AF first provides a DNAI (that is, an MEC access point, or an access network entity in which an MEC server is located) of a related application in the SMF through the PCF. The SMF triggers a new PSA/ULCL addition procedure after the terminal moves, a corresponding data flow is detected, or a DNS query request is received. After selecting the corresponding PSA/ULCL, the SMF notifies the AF of the DNAI change. In addition, an N6 configuration option and a related routing rule required by the PSA/ULCL are obtained via an AF notification response, and then the new PSA/ULCL is configured.

A game interworking scenario is used as an example to describe the MEC scenario of group users. At present, mobile games are mainly interactive, and multi-player matching is often required. A server architecture of the game includes a login server and a service server. The login server manages user registration information, personal information, and the like in a unified manner, and provides a grouping function during game matching. The service server provides an actual game service for the user after the user accesses the game.

In a system architecture of a game scenario shown in FIG. 2, it is assumed that UE 1 and UE 2 are respectively located in two different geographical locations and access a mobile network through a gNB 1 and a gNB 2 respectively. UPF anchors of the UE 1 and the UE 2 are respectively a UPF 1 and a UPF 3, and the UE 1 and the UE 2 are connected to a login server of the game through the UPF 1 and the UPF 3. In this case, the UE 1 and the UE 2 initiate matching requests, and the login server allocates a service server to the UEs to play the game. When the service server is an MEC server, an operation procedure of the login server is as follows: Select a service server based on IP addresses of the UE 1 and the UE 2 and a server load, and indicate the two UEs to access the server. At the same time, the SMF is indicated to add ULCLs for the UE 1 and the UE 2 and connect them to corresponding UPFs and the service server. The two UEs start playing the game. In this scenario, the network does not support DNAI selection by dynamic grouped users. To ensure that a same service server can be allocated to two UEs, the login server selects a DNAI based on information such as IP addresses of the UEs. After determining a unique service server, the login server notifies the network to configure the DNAI. When selecting the DNAI, the login server does not consider actual locations of the UEs (the IP addresses of the UEs are allocated by remote anchors: the UPF 1 and the UPF 3, and cannot reflect actual distributions of the UEs) and a network topology. The service server connected to the UE 1 and the UE 2 may not be optimal, which affects game experience of the UEs and wastes network resources.

Based on this, this application provides a method for determining an MEC access point. An MEC access point to be accessed by a terminal group of a first service is determined based on network topology information of MEC access points that are respectively closest to all terminals in the terminal group of the first service and that support the first service. Because the network topology information reflects locations and a connection relationship of the MEC access points, actual locations of the terminals in the terminal group may be considered when the MEC access point is being selected, so that a path of the MEC access point selected for the group users is optimal for the users in the terminal group, user experience is improved, and network resources are saved.

It should be noted that in this embodiment of this application, the "closest" may be the closest in a physical location, or may be the closest in a link length. In addition, in another possible implementation, the MEC access point is not limited to a closest MEC access point that supports the service, and the MEC access point may be another optimal MEC access point that supports the service, for example, an MEC access point that has the best transmission performance, has the largest processing resource, has the strongest processing capability, or has the best compatibility.

The following describes embodiments of this application in detail with reference to the accompanying drawings. It should be noted that names of messages between network elements, names of parameters in the messages, or the like in the following embodiments of this application are merely examples, and there may be other names in an example implementation. This is not specifically limited in embodiments of this application.

According to one aspect, an embodiment of this application provides a network device. FIG. 3 is a schematic composition diagram of a communication device 30 according to an embodiment of this application. As shown in FIG. 3, the communication device 30 may include at least one processor 31, a memory 32, a communication interface 33, and a communication bus 34. The following describes components of the communication device 30 in detail with reference to FIG. 3.

The processor 31 may be one processor, or may be a collective name of a plurality of processing elements. For example, the processor 31 is a central processing unit (CPU), or may be an application specific integrated circuit (ASIC), or is configured as one or more integrated circuits that implement embodiments of this application, for example, one or more microprocessors (DSP), or one or more field programmable gate arrays (FPGA).

The processor 31 may perform various functions of a functional alias control server by running or executing a software program stored in the memory 32 and invoking data stored in the memory 32. In some embodiments, the processor 31 may include one or more CPUs, for example, a CPU 0 and a CPU 1 shown in FIG. 3.

In some embodiments, the communication device 30 may include a plurality of processors, for example, a processor 31 and a processor 35 shown in FIG. 3. Each of the processors may be a single-core processor (single-CPU) or may be a multi-core processor (multi-CPU). The processor herein may be one or more devices, circuits, and/or processing cores configured to process data (for example, a computer program instruction).

The memory 32 may be a read-only memory (ROM) or another type of static storage device that can store static information and instructions, or a random access memory (RAM) or another type of dynamic storage device that can store information and instructions. The memory may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible by a computer, but is not limited thereto. The memory 32 may exist independently, and is connected to the processor 31 through the communication bus 34. The memory 32 may be alternatively integrated with the processor 31. The memory 32 is configured to store a software program for performing the solutions in this application, and the processor 31 controls execution.

The communication interface 33 uses any apparatus such as a transceiver, and is configured to communicate with another device or a communication network. The communication network may be an Ethernet, an AN, a wireless local area network ( ), or the like. The communication interface 33 may include a receiving unit and a sending unit.

The communication bus 34 may be an industry standard architecture (ISA) bus, a peripheral component (PCI) bus, an extended industry standard architecture (EISA) bus, or the like. The bus may be classified into an address bus, a data bus, a control bus, and the like. For ease of representation, only one thick line is for representing the bus in FIG. 3, but this does not mean that there is only one bus or only one type of bus.

It should be noted that the components shown in FIG. 3 constitute no limitation on the communication apparatus. In addition to the components shown in FIG. 3, the communication apparatus may include more or fewer components than those shown in the figure, or combine some components, or have different component arrangements.

In a possible implementation, the communication device 30 may be a first network element that determines a first MEC access point to be accessed by a terminal group of a first service, and the first network element may be an AF or an NEF. The processor 31 runs or executes a software program and/or a module stored in the memory 32, and invokes data stored in the memory 32 to perform the following functions:

obtaining a first MEC access point to be accessed by a terminal group of a first service, where the first MEC access point is obtained based on at least network topology information of MEC access points that are respectively closest to all terminals in the terminal group and that support the first service; where the network topology information indicates whether at least two MEC access points are connected, and/or the network topology information indicates performance of a link between at least two MEC access points; and sending an identifier of the first MEC access point to a session management network element that controls each terminal, where the identifier of the first MEC access point is used for each terminal to access the first MEC access point, so that the session management network element adds a ULCL; and the terminal group of the first service includes a terminal requesting the first service and/or a terminal subscribing to the first service.

In another possible implementation, the communication device 30 may be a third network element that can determine network topology information of a plurality of MEC access points. For example, the third network element may be a network data analytics function (NWDAF). The processor 31 runs or executes the software program and/or the module stored in the memory 32 and invokes data stored in the memory 32, to perform the following functions:

receiving second information from a first network element, where the second information includes identifiers of a plurality of MEC access points, and the MEC access points support a first service; obtaining a sixth network element corresponding to each MEC access point of the plurality of MEC access points; sending fifth information to each sixth network element, where the fifth information includes the identifiers of the plurality of MEC access points in the second information; receiving, from each sixth network element, topology information of MEC access points known to the sixth network element in the plurality of MEC access points, where the topology information is obtained based on the fifth information and indicates whether at least two MEC access points are connected, and/or the topology information indicates performance of a link between at least two MEC access points; aggregating, by the third network element, the received topology information to obtain the network topology information; and sending the network topology information to the first network element, where the network topology information is used to determine an MEC access point to be accessed by a terminal group of the first service, and the terminal group of the first service includes a terminal requesting the first service and/or a terminal subscribing to the first service.

In another possible implementation, the communication device 30 may be a fourth network element that can determine network topology information of a plurality of MEC access points. For example, the fourth network element may be an SMF or an ECS. The processor 31 runs or executes the software program and/or the module stored in the memory 32 and invokes data stored in the memory 32, to perform the following functions:

receiving third information from a first network element, where the third information includes identifiers of a plurality of MEC access points, and the MEC access points support a first service; obtaining network topology information of the plurality of MEC access points; where the network topology information indicates whether at least two MEC access points are connected, and/or the network topology information indicates performance of a link between at least two MEC access points; determining, from the plurality of MEC access points according to a preset rule and the network topology information, a first MEC access point to be accessed by a terminal group of the first service; and sending an identifier of the first MEC access point to the first network element, where the terminal group of the first service includes a terminal requesting the first service and/or a terminal subscribing to the first service.

In a possible implementation, the communication device 30 may be a fifth network element that can determine network topology information of a plurality of MEC access points. For example, the fifth network element may be an SMF. The processor 31 runs or executes the software program and/or the module stored in the memory 32 and invokes data stored in the memory 32, to perform the following functions:

receiving fourth information from a first network element, where the fourth information includes identifiers of terminals in a terminal group of a first service and identifiers of MEC access points supporting the first service; obtaining a context of each terminal in the terminal group, where a context of a terminal includes network topology information of an access network element accessed by the terminal and the MEC access points supporting the first service; where the network topology information indicates whether the access network element is connected to the MEC access points, and whether at least two MEC access points are connected; and/or the network topology information indicates performance of links between the access network element and the MEC access points, and between at least two MEC access points; determining, according to a preset rule and the network topology information in the context of each terminal, a first MEC access point to be accessed by the terminal group of the first service from the MEC access points supporting the first service; and sending an identifier of the first MEC access point to the first network element.

According to another aspect, an embodiment of this application provides a method for determining an MEC access point, applied to a process in which a core network device selects an MEC access point to be accessed by a terminal group.

It should be noted that for different terminal groups, MEC access points to be accessed by the terminal groups may be separately determined according to the method provided in embodiments of this application. In this embodiment of this application, only the terminal group of the first service is used as an example to describe a process of determining the MEC access point to be accessed by the terminal group of the first service. Details are not described again. It should be understood that the terminal group described below is the terminal group of the first service.

As shown in FIG. 4, the method for determining an MEC access point provided in embodiments of this application may include the following steps.

S401: A first network element obtains a first MEC access point to be accessed by a terminal group of a first service, where the first MEC access point is obtained based on at least network topology information of MEC access points that are respectively closest to all terminals in the terminal group and that support the first service.

The terminal group of the first service includes a plurality of terminals, and the terminal group of the first service may include: a terminal requesting the first service; or a terminal that subscribes to the first service. Features of the terminals in the terminal group of the first service may be configured based on an actual requirement. This is not specifically limited in this embodiment of this application.

It should be understood that the first network element is a core network device configured to determine an MEC access point of a terminal in a mobile network architecture. A specific type of the first network element is not limited in this embodiment of this application. For example, the first network element may be an AF, an NEF, or another functional network element.

Optionally, in S401, the first network element may determine the first MEC access point by using a plurality of different solutions. This is not specifically limited in this embodiment of this application. For example, the first network element may determine the first MEC access point by using a solution including but not limited to any one of the following solutions:

Solution 1: The first network element obtains, from other network elements, network topology information of MEC access points respectively closest to the terminals in the terminal group of the first service, and the first network element determines the first MEC access point based on the network topology information from the MEC access points respectively closest to the terminals in the terminal group of the first service.

In Solution 1, the first network element first obtains, from second network elements respectively corresponding to the terminals in the terminal group, the network topology information of the MEC access points respectively closest to the terminals in the terminal group, and then determines the first MEC access point according to a preset rule from the MEC access points respectively closest to the terminals in the terminal group. For an example implementation of Solution 1, refer to a process of the method for determining an MEC access point shown in FIG. 5A and FIG. 5B.

The second network element may be an SMF network element that controls the terminal.

The network topology information of the MEC access points respectively closest to the terminals in the terminal group indicates whether at least two MEC access points in the MEC access points respectively closest to the terminals in the terminal group are connected, and/or the network topology information indicates performance of a link between at least two MEC access points in the MEC access points respectively closest to the terminals in the terminal group. The link performance indicates an indicator of the link between the two, and the link performance may include but is not limited to a delay, a bandwidth, and the like.

Optionally, the foregoing network topology information may record whether the at least two MEC access points are connected and the link indicator, or may record only an indicator of a link between connected MEC access points.

For example, it is assumed that DNAI 1 and DNAI 2 are reachable to each other, a delay is d1, and a bandwidth is b1; DNAI 2 and DNAI 3 are reachable to each other, a delay is d2 and a bandwidth is b2; and DNAI 1 and DNAI 3 are unreachable. In this case, network topology information of the three DNAIs may be expressed as a fully-connected mapping table shown in Table 1, and is represented by using connectivity and connection parameters between every two DNAIs.

TABLE 1

|       | DNAI 1     | DNAI 2     | DNAI 3     |
|-------|------------|------------|------------|
| DNAI 1 |            | Yes, d1, b1 | No         |
| DNAI 2 | Yes, d1, b1 |            | Yes, d2, b2 |
| DNAI 3 | No         | Yes, d2, b2 |            |

Alternatively, network topology information of the three DNAIs may be expressed as a record table shown in Table 2, and only endpoints and a path parameter of each reachable connection are recorded.

TABLE 2

| 1 | DNAI 1, DNAI 2 | d1, b1 |
| 2 | DNAI 2, DNAI 3 | d2, b2 |

It should be noted that Table 1 and Table 2 merely describe the foregoing network topology information by using an example, and do not limit a form or content of the network topology information.

In a possible implementation, the preset rule may include: The first network element may determine, based on a load and/or a link delay of the MEC access point and based on the foregoing network topology information, the first MEC access point from the MEC access points respectively closest to the terminals in the terminal group. Content of the preset rule may be configured based on an actual requirement. This is not limited in this embodiment of this application.

For example, the preset rule may be determining, from the MEC access points respectively closest to the terminals in the terminal group, an MEC access point whose load is less than or equal to a first threshold and whose link delay is less than or equal to a second threshold.

The first threshold and the second threshold may be configured based on an actual requirement, and are not limited.

It should be noted that when it is determined that there are a plurality of MEC access points whose loads are less than or equal to the first threshold and whose link delays are less than or equal to the second threshold in the MEC access points respectively closest to the terminals in the terminal group, an MEC access point whose load is less than or equal to the first threshold and whose link delay is less than or equal to the second threshold may be randomly selected; or an MEC access point with the smallest load is selected from the plurality of MEC access points whose loads are less than or equal to the first threshold and whose link delays are less than or equal to the second threshold; or an MEC access point with the smallest link delay is selected; or another manner is used to select an MEC access point as the first MEC access point.

Solution 2: The first network element obtains, from another network element, an MEC access point closest to each terminal in the terminal group of the first service, and the first network element sends the obtained MEC access point closest to each terminal in the terminal group of the first service to another network element, and requests the another network element to determine the first MEC access point.

In Solution 2, the first network element requests, from a second network element corresponding to each terminal in the terminal group, to obtain the MEC access point closest to each terminal, and the first network element sends, to the fourth network element, an identifier of the MEC access point closest to each terminal in the terminal group, to indicate the fourth network element to determine the first MEC access point. Finally, the first network element receives an identifier of the first MEC access point from the fourth network element. For an example implementation of Solution 2, refer to a process of the method for determining an MEC access point shown in FIG. 6.

The fourth network element may be an SMF network element or an ECS network element that is selected by the first network element and that can select an MEC access point. The first network element may select the fourth network element based on a function of each network element. A process in which the first network element selects the fourth network element is not limited in this embodiment of this application.

It should be noted that the fourth network element may determine, according to a preset rule, the first MEC access point from the MEC access points respectively closest to the terminals in the terminal group.

Solution 3: The first network element provides, to another network element, identifiers of the terminals in the terminal group of the first service and identifiers of MEC access points supporting the first service, and requests the another network element to determine the first MEC access point.

In Solution 3, the first network element sends fourth information to a fifth network element, where the fourth information includes the identifier of each terminal in the terminal group and the identifiers of the MEC access points that support the first service, and the fourth information indicates to determine the first MEC access point to be accessed by the terminal group. The first network element receives, from the fifth network element, an identifier of the first MEC access point that is determined based on the fourth information. For an example implementation of Solution 3, refer to a process of the method for determining an MEC access point shown in FIG. 7.

The fifth network element is any network element that has a function of selecting an MEC access point. For example, the fifth network element may be an SMF network element.

S402: The first network element sends the identifier of the first MEC access point to a session management network element that controls each terminal in the terminal group, where the identifier is used for each terminal in the terminal group to access the first MEC access point.

After receiving the identifier of the first MEC access point, the session management network element (SMF) starts a connection procedure. The connection procedure may be the same as the foregoing DNAI change procedure, and details are not described herein again.

According to the method for determining an MEC access point provided in this embodiment of this application, the MEC access point to be accessed by users in the terminal group is determined based on the network topology information of the MEC access points respectively closest to the terminals in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

Figure 5A:
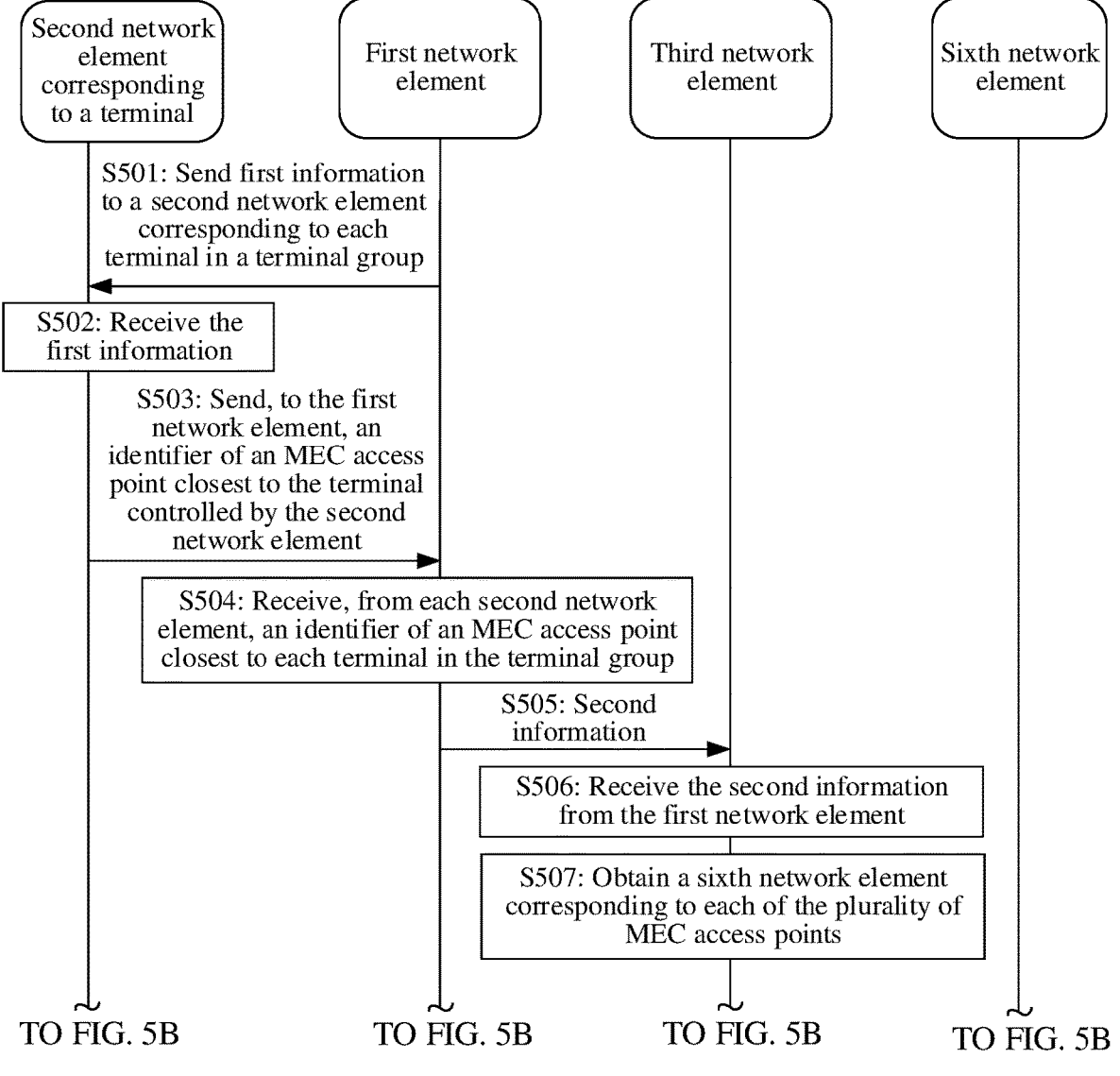

In still another aspect, the method for determining an MEC access point provided in embodiments of this application may be shown in FIG. 5A and FIG. 5B. Solution 1 in S401 is used in the method. As shown in FIG. 5A and FIG. 5B, the method may include the following steps.

S501: A first network element sends first information to a second network element corresponding to each terminal in a terminal group.

The first information includes identifiers of MEC access points supporting a first service and an identifier of a terminal managed by the second network element in the terminal group, and the first information may be used to obtain an MEC access point closest to each terminal in the terminal group. The identifier of the terminal may be an IP address of the terminal or other information. This is not limited in this embodiment of this application.

The identifiers of the MEC access points supporting the first service that are included in the first information may be understood as identifiers of all MEC access points that support the first service.

When the second network element is an SMF network element, in S501, the first network element may first query a PCF corresponding to each terminal in the terminal group, and send the first information to the PCF corresponding to each terminal, and the PCF sends the first information to the SMF controlling the terminal.

Optionally, the first information may further include an identifier of the first service. The identifier of the first service is used to uniquely indicate the first service. A form and content of the identifier of the first service are not limited in this embodiment of this application. For example, the identifier of the first service may be an APP name or mapping information of the first service.

The first information may be newly defined information, or may be an existing request message. This is not limited in this embodiment of this application. For example, the first information may be an AF request in an AF influence traffic routing procedure.

S502: The second network element receives the first information, and determines an MEC access point closest to a terminal controlled by the second network element.

For example, the second network element may determine a location of the terminal based on an identifier of a RAN accessed by the terminal or based on a granularity of a TA in which the terminal is located, and then determine, based on the location of the terminal, the MEC access point closest to the terminal.

S503: The second network element sends, to the first network element, an identifier of the MEC access point closest to the terminal controlled by the second network element.

S504: The first network element receives, from each second network element, an identifier of an MEC access point closest to each terminal in the terminal group.

S505: The first network element sends second information to a third network element, where the second information includes the identifier of the MEC access point closest to each terminal in the terminal group.

The second information may be used to obtain network topology information of the MEC access points respectively closest to the terminals in the terminal group. The identifiers of the MEC access points included in the second information are identifiers of the MEC access points respectively closest to the terminals in the terminal group of the first service.

Optionally, the second information may further include an identifier of the first service.

The third network element is a network element that can obtain network topology information of MEC access points. A type of the third network element is not limited in this embodiment of this application. For example, the third network element may be an NWDAF network element.

The second information may be newly defined information, or may be an existing request message. This is not limited in this embodiment of this application. For example, the second information may be an Nnwdaf_AnalyticsInfo_Request message.

S506: The third network element receives the second information from the first network element.

It should be noted that the second information received by the third network element in S506 is the second information sent by the first network element in S505.

The second information includes identifiers of a plurality of MEC access points, which are the identifiers of the MEC access points respectively closest to the terminals in the terminal group.

S507: The third network element obtains a sixth network element corresponding to each of the plurality of MEC access points.

In S507, the third network element obtains the sixth network element corresponding to each MEC access point in the plurality of MEC access points indicated by the identifiers of the MEC access points included in the second information. That is, in S507, the third network element obtains the sixth network element corresponding to each MEC access point in the MEC access points respectively closest to the terminals in the terminal group of the first service.

The sixth network element is a network element that records network topology information of MEC access points. For example, the sixth network element may be an operations administration maintenance network element or a session management network element.

For example, the operations administration maintenance network element may be an OAM network element in a 5G network, and the session management network element may be an SMF network element in the 5G network.

The third network element may obtain, through querying based on the identifiers of the MEC access points, sixth network elements corresponding to the MEC access points from a network element that performs a storage function in the network. A correspondence between an MEC access point and a sixth network element may be recorded in the network element that performs the storage function.

For example, the network element that performs the storage function may be a network repository function (NRF) network element in the 5G network.

S508: The third network element sends fifth information to each sixth network element.

The fifth information includes the identifiers of the plurality of MEC access points included in the second information, that is, the fifth information includes the identifiers of the MEC access points respectively closest to the terminals in the terminal group.

The fifth information may be newly defined information, or may be existing information. This is not limited in this embodiment of this application.

S509: The third network element receives, from each sixth network element, topology information of MEC access points known to the sixth network element in the plurality of MEC access points that is obtained based on the fifth information.

The topology information indicates whether at least two MEC access points are connected, and/or the topology information indicates performance of a link between at least two MEC access points. The topology information is a subset of the foregoing network topology information, and content of the topology information is the same as that of the network topology information. Details are not described herein again.

S510: The third network element aggregates the topology information to obtain the network topology information.

In S510, the third network element performs an aggregation operation on the topology information received from all the sixth network elements, that is, performs a combination operation, removes duplicate content, and combines the topology information into one piece of network topology information, which is used as the network topology information of the MEC access points respectively closest to the terminals in the terminal group of the first service.

S511: The third network element sends the network topology information to the first network element.

The third network element sends, to the first network element, the network topology information obtained in S510, where the network topology information is used to determine an MEC access point to be accessed by the terminal group of the first service.

S512: The first network element receives, from the third network element, the network topology information obtained based on the second information.

The network topology information obtained based on the second information is the network topology information of the MEC access points respectively closest to the terminals in the terminal group of the first service.

S513: The first network element determines, according to a preset rule and the network topology information, a first MEC access point from the MEC access points respectively closest to the terminals in the terminal group.

A process in which the first network element determines the first MEC access point according to the preset rule and the network topology information is described in detail in Solution 1 of S401, and details are not described herein again.

S514: The first network element sends an identifier of the first MEC access point to a session management network element that controls each terminal in the terminal group, where the identifier is used for each terminal in the terminal group to access the first MEC access point.

It should be noted that for an example implementation of S514, refer to the description of S402. Details are not described herein again.

According to the method for determining an MEC access point provided in this embodiment of this application, the third network element may obtain, based on an indication of the first network element, the network topology information of the plurality of MEC access points supporting the first service, and provide the network topology information for the first network element. The first network element selects, based on the network topology information, the MEC access point to be accessed by users in the terminal group. Because the network topology information reflects locations and a connection relationship of the MEC access points, when the MEC access point is determined based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

Figure 6:
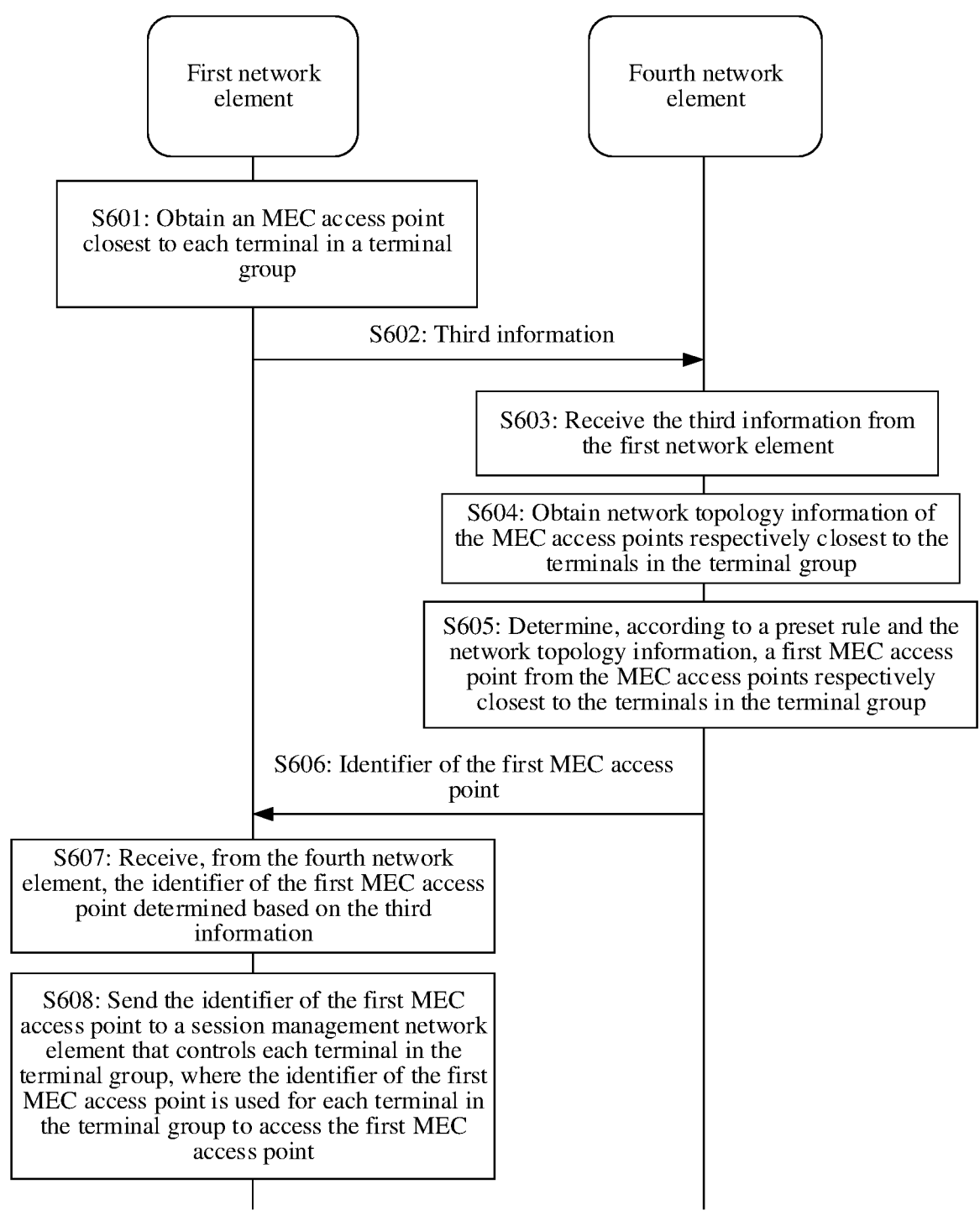
FIG. 6 is a schematic flowchart of still another method for determining an MEC access point according to an embodiment of this application.

In still another aspect, the method for determining an MEC access point provided in embodiments of this application may be shown in FIG. 6. Solution 2 in S401 is used in the method. As shown in FIG. 6, the method may include the following steps.

S601: A first network element obtains an MEC access point closest to each terminal in a terminal group.

It should be noted that for an example implementation of S601, refer to the foregoing descriptions of S501 to S504, and details are not described herein again.

S602: The first network element sends third information to a fourth network element, where the third information includes an identifier of the MEC access point closest to each terminal in the terminal group.

The third information may be used to indicate to select a first MEC access point to be accessed by the terminal group.

For example, the third information may carry first indication information, and the first indication information may be used to indicate to select, from the MEC access points indicated by the identifiers of the MEC access points that are carried in the third information, an MEC access point as the first MEC access point to be accessed by the terminal group. Content and a form of the first indication information may be configured based on an actual requirement. This is not limited in this embodiment of this application.

Optionally, the third information may further include an identifier of a first service.

For example, when the fourth network element is an SMF network element, the first network element may send the third information to a PCF, and the PCF forwards the third information to the SMF network element.

The third information may be newly defined information, or may be existing information. This is not limited in this embodiment of this application.

S603: The fourth network element receives the third information from the first network element.

It should be noted that the third information received by the fourth network element in S603 is the third information sent by the first network element in S602.

The third information received by the fourth network element includes identifiers of a plurality of MEC access points, the plurality of MEC access points support the first service, and the plurality of MEC access points are the MEC access points respectively closest to the terminals in the terminal group. The third information may be used to request the fourth network element to determine the first MEC access point to be accessed by the terminal group of the first service.

S604: The fourth network element obtains network topology information of the MEC access points respectively closest to the terminals in the terminal group.

The network topology information indicates whether at least two MEC access points are connected, and/or the network topology information indicates performance of a link between at least two MEC access points. The network topology has been described in S401, and details are not described herein again.

In a possible implementation, that the fourth network element obtains network topology information of the MEC access points respectively closest to the terminals in the terminal group may be implemented as follows: The fourth network element stores the network topology information, and the fourth network element only needs to read the locally stored network topology information in S604.

For example, the fourth network element may store topology information of all MEC access points in a network. In S604, the fourth network element selects, from the locally stored topology information based on the identifiers of the MEC access points in the third information, topology information of the MEC access points included in the third information, to obtain the network topology information.

In another possible implementation, that the fourth network element obtains network topology information of the MEC access points respectively closest to the terminals in the terminal group may be implemented as follows: The fourth network element obtains the network topology information from sixth network elements, which may include the following steps:

Step 1: The fourth network element obtains a sixth network element corresponding to each MEC access point in the MEC access points respectively closest to the terminals in the terminal group.

Step 2: The fourth network element sends fifth information to each sixth network element, where the fifth information includes identifiers of a plurality of MEC access points.

MEC access points indicated by the identifiers of the plurality of MEC access points included in the fifth information is the MEC access points respectively closest to the terminals in the terminal group. The fifth information is used to obtain topology information of MEC access points that are known to the sixth network element and that are in the MEC access points respectively closest to the terminals in the terminal group.

Step 3: The fourth network element receives, from each sixth network element, topology information of MEC access points known to the sixth network element in the plurality of MEC access points, where the topology information is obtained based on the fifth information.

Step 4: The fourth network element aggregates the received topology information to obtain the network topology information.

It should be noted that the sixth network element and the fifth information have been described in detail in the foregoing S507 to S510. For an example implementation of step 1 to step 4, refer to the foregoing S507 to S510. The only difference is that the operations are performed by the fourth network element herein. Details are not described herein again.

S605: The fourth network element determines, according to a preset rule and the network topology information, the first MEC access point from the MEC access points respectively closest to the terminals in the terminal group.

The MEC access points respectively closest to the terminals in the terminal group are included in the third information.

For an example implementation of S605, refer to the example implementation in which the first network element determines, according to the preset rule and the network topology information, the first MEC access point from the MEC access points respectively closest to the terminals in the terminal group in Solution 1 in S401. Details are not described herein again.

S606: The fourth network element sends an identifier of the first MEC access point to the first network element.

S607: The first network element receives, from the fourth network element, the identifier of the first MEC access point that is determined based on the third information.

In this way, after S601 to S607, the first network element obtains the first MEC access point to be accessed by the terminal group of the first service.

S608: The first network element sends the identifier of the first MEC access point to a session management network element that controls each terminal in the terminal group, where the identifier of the first MEC access point is used for each terminal in the terminal group to access the first MEC access point.

It should be noted that for an example implementation of S608, refer to the description of S402. Details are not described herein again.

According to the method for determining an MEC access point provided in this embodiment of this application, the fourth network element first obtains, based on an indication of the first network element, the network topology information of the MEC access points supporting the first service, and then selects, based on the network topology information, the MEC access point to be accessed by users in the terminal group. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

Figure 7:
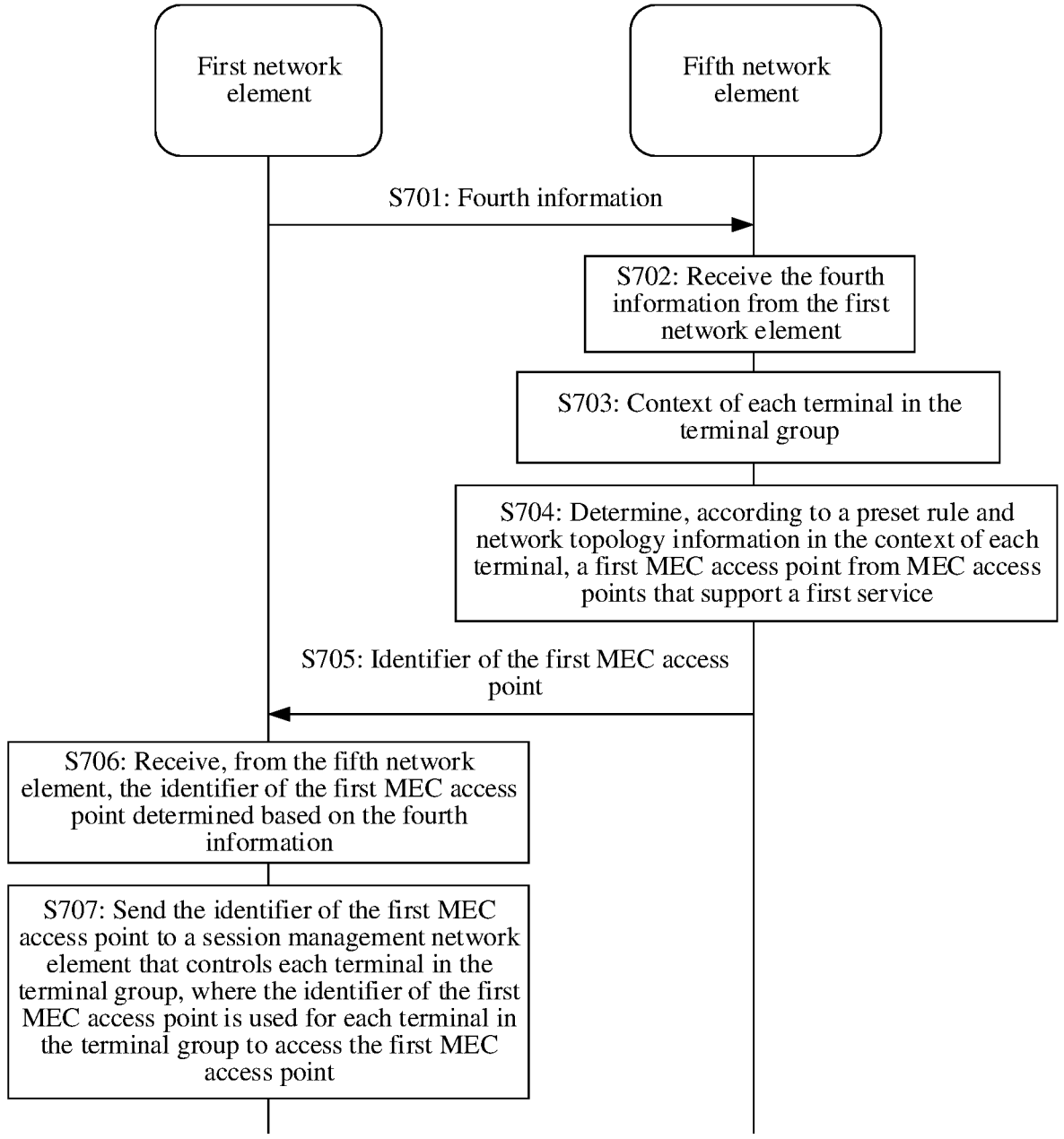
FIG. 7 is a schematic flowchart of another method for determining an MEC access point according to an embodiment of this application.

In still another aspect, the method for determining an MEC access point provided in embodiments of this application may be shown in FIG. 7. Solution 3 in S401 is used in the method. As shown in FIG. 7, the method may include the following steps.

S701: A first network element sends fourth information to a fifth network element, where the fourth information includes an identifier of each terminal in a terminal group of a first service and identifiers of MEC access points supporting the first service.

The fourth information may be used to indicate to determine a first MEC access point to be accessed by the terminal group.

The identifiers of the MEC access points supporting the first service that are included in the fourth information may be understood as identifiers of all MEC access points that support the first service.

The fifth network element may be any core network element that supports determining of an MEC access point. For example, the fifth network element may be an SMF network element that controls any terminal in the terminal group.

For example, when the fifth network element is an SMF network element, the first network element may send the fourth information to a PCF, and the PCF forwards the fourth information to the SMF network element.

For example, the fourth information may carry second indication information, and the second indication information may be used to indicate to select, from the MEC access points indicated by the identifiers of the MEC access points that are carried in the fourth information, an MEC access point as the first MEC access point to be accessed by the terminal group. Content and a form of the second indication information may be configured based on an actual requirement. This is not limited in this embodiment of this application.

Optionally, the fourth information may further include an identifier of the first service.

The fourth information may be newly defined information, or may be an existing request message. This is not limited in this embodiment of this application. For example, the fourth information may be an AF request in an AF influence traffic routing procedure.

S702: The fifth network element receives the fourth information from the first network element.

S703: The fifth network element obtains a context of each terminal in the terminal group.

A context of a terminal includes network topology information of an access network element accessed by the terminal and the MEC access points that support the first service. The network topology information indicates whether the access network element accessed by the terminal is connected to the MEC access points, and whether at least two MEC access points are connected; and/or the network topology information indicates performance of links between the access network element accessed by the terminal and the MEC access points, and between at least two MEC access points. For example, the access network element may be a RAN.

It should be noted that a form of the network topology information is similar to that of the network topology information described in S401, and details are not described one by one again.

In a possible implementation, that the fifth network element obtains a context of each terminal in the terminal group in S703 may be implemented as follows: The fifth network element obtains the context of each terminal in the terminal group by querying a data storage function.

Contexts of different terminals are recorded in the data storage function.

For example, when the terminals in the terminal group are controlled by different SMFs in a same SMF pool, the different SMFs may perform data query via an unstructured data storage network function (UDSF). The fifth network element is an SMF network element. The data storage function may be a UDSF network element.

In another possible implementation, the fifth network element queries, from a unified data management platform, session management network elements corresponding to terminals other than a terminal corresponding to the fifth network element. The fifth network element separately obtains, from the session management network elements corresponding to the terminals, contexts of the terminals other than the terminal corresponding to the fifth network element.

The unified data management platform records information of corresponding session management network elements stored in session creation phases of different terminals. The session management network element records a context of a terminal managed by the session management network element.

The terminal corresponding to the fifth network element may be a terminal managed by the fifth network element.

For example, when the terminals in the terminal group are controlled by different SMFs in a same SMF pool, the different SMFs may perform data query through an interface between the SMFs. The fifth network element is an SMF network element, the unified data management platform may be a UDM network element, and the session management network element may be an SMF network element.

S704: The fifth network element determines, according to a preset rule and the network topology information in the context of each terminal, the first MEC access point from the MEC access points that support the first service.

For an example implementation of S704, refer to the example implementation in which the first network element determines, according to the preset rule and the network topology information, the first MEC access point from the MEC access points respectively closest to the terminals in the terminal group in Solution 1 in S401. Details are not described herein again.

S705: The fifth network element sends an identifier of the first MEC access point to the first network element.

S706: The first network element receives, from the fifth network element, the identifier of the first MEC access point that is determined based on the fourth information.

In this way, after S701 to S706, the first network element obtains the first MEC access point to be accessed by the terminal group.

S707: The first network element sends the identifier of the first MEC access point to a session management network element that controls each terminal in the terminal group, where the identifier is used for each terminal in the terminal group to access the first MEC access point.

It should be noted that for an example implementation of S707, refer to the description of S402. Details are not described herein again.

According to the method for determining an MEC access point provided in this embodiment of this application, network topology information of access network elements accessed by the terminals in the terminal group and the MEC access points supporting the first service is first obtained, and then the MEC access point to be accessed by users in the terminal group is selected based on the network topology information. Because the network topology information reflects locations and a connection relationship of the MEC access points, when the MEC access point is selected based on the network topology information of the MEC access points, actual locations of the terminals in the terminal group may be considered, so that a path of the MEC access point selected for the users in the terminal group is optimal for the users in the terminal group, and network resources are saved on a premise of improving user experience.

The following describes, by using specific embodiments, the method for determining an MEC access point provided in this application by using examples.

Embodiment 1

Figure 8A:
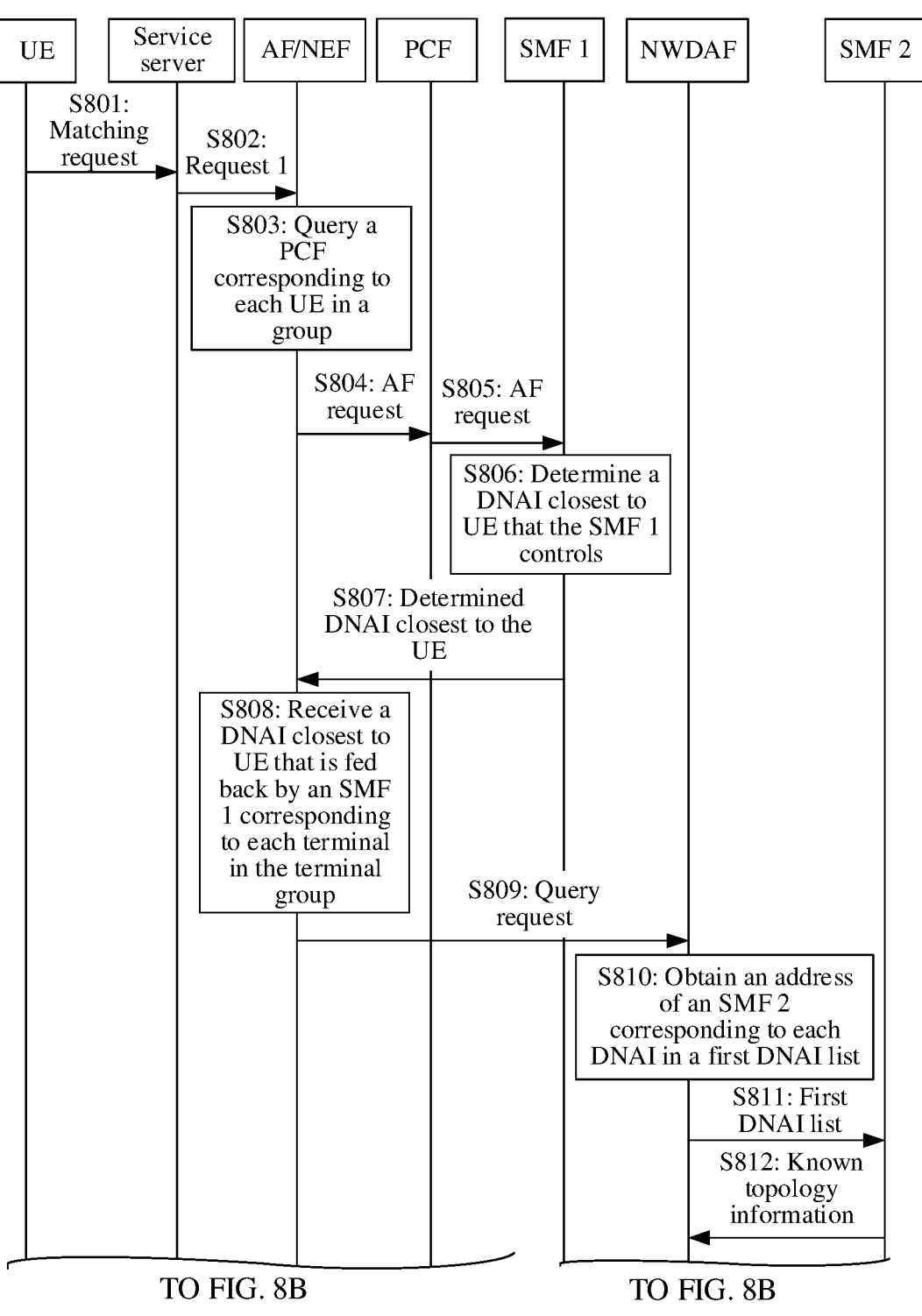
FIG. 8A and FIG. 8B are a schematic flowchart of still another method for determining an MEC access point according to an embodiment of this application.
Figure 8B:
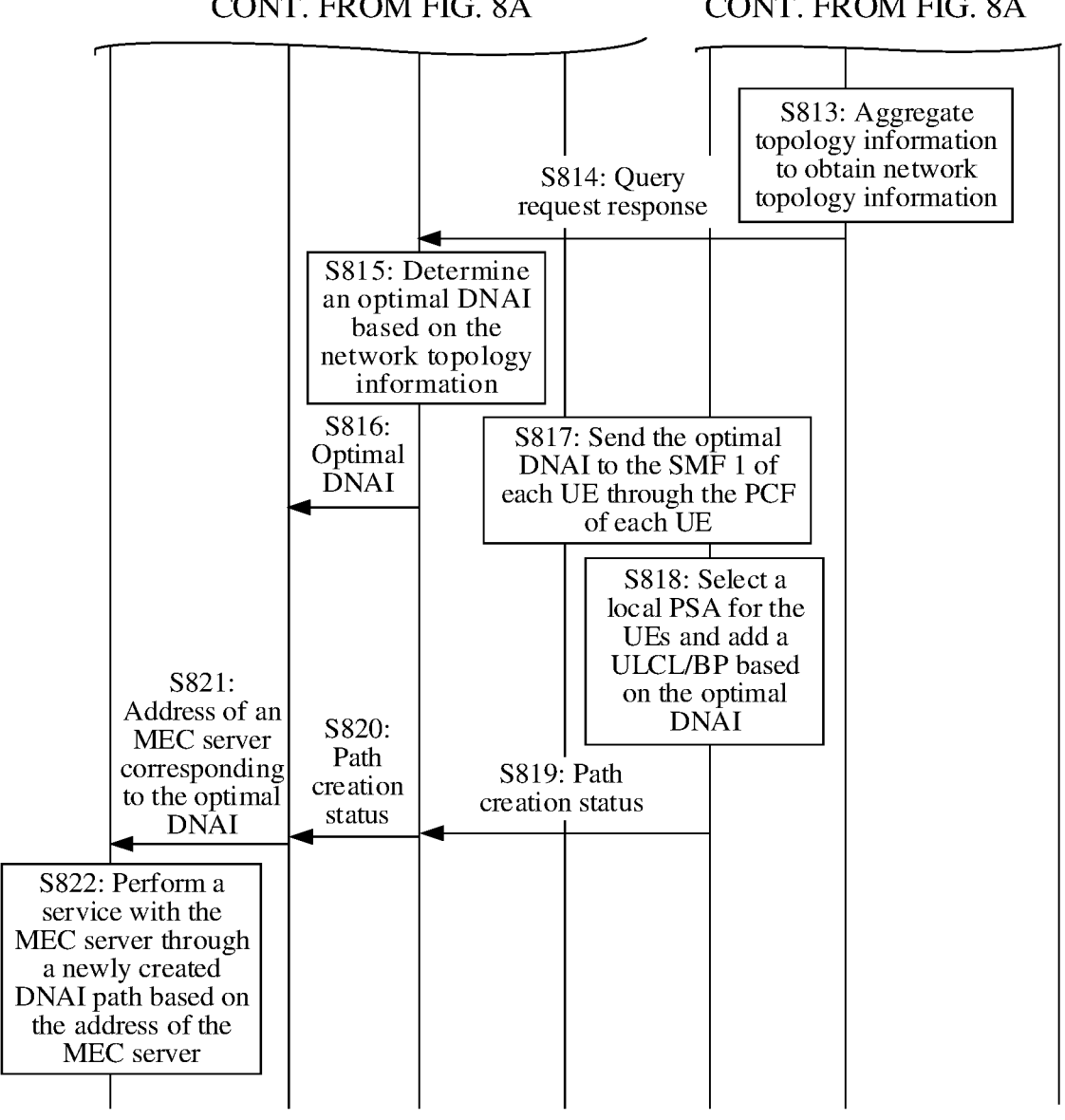

The method for determining an MEC access point provided in Embodiment 1 of this application may be shown in FIG. 8A and FIG. 8B. In this scenario, it is assumed that a plurality of UEs in a terminal group of a first service are controlled by a plurality of different SMFs. As shown in FIG. 8A and FIG. 8B, the method may include the following steps.

S801: The plurality of UEs simultaneously initiate, through a user plane path, matching requests for a first service to a service server.

The matching request is used to request the first service, and the plurality of UEs are UEs in a group of the first service.

S802: The service server determines to enable an MEC server to provide a service for the UEs in the group, and sends a request 1 to an AF/NEF.

The request 1 includes identifiers of the plurality of UEs and identifiers of DNAIs supporting the first service.

It should be noted that a specific manner in which the service server determines whether to start the MEC server is not described in this embodiment of this application.

S803: The AF/NEF queries, via a binding support function (BSF), a PCF corresponding to each UE in the group.

S804: The AF/NEF initiates an AF request to the PCF.

The AF request carries the identifiers of the DNAIs supporting the first service and the identifiers of the UEs, and the AF request is used to query a DNAI closest to each UE.

S805: The PCF forwards the AF request to an SMF 1 corresponding to the PCF.

S806: The SMF 1 determines a DNAI closest to UE controlled by the SMF 1.

In S806, the SMF 1 determines, based on the DNAIs that are in the AF request and that support the first service, location information that is of the UE and that is indicated by the identifiers of the UEs in the AF request, and topology information of the UE, the DNAI that is closest to the UE.

S807: The SMF 1 feeds back the determined DNAI closest to the UE to the AF/NEF.

S808: The AF/NEF receives the DNAI that is closest to the UE and that is fed back by the SMF 1 corresponding to each terminal in the terminal group.

S809: The AF/NEF initiates a query request to an NWDAF.

The query request includes a first DNAI list, where first DNAI list includes DNAIs closest to the UEs in the terminal group, and the query request is used to request to feed back topology information of the DNAIs in the first DNAI list.

For example, the query request may be an Nnwdaf_AnalyticsInfo_Request message.

S810: The NWDAF provides the first DNAI list for an NRF, and obtains an address of an SMF 2 corresponding to each DNAI in the first DNAI list.

S811: The NWDAF provides each SMF 2 with the first DNAI list based on the address of the SMF 2, and requests topology information of DNAIs known to the SMF 2.

S812: The SMF 2 feeds back the topology information of the DNAIs known to the SMF 2 in the first DNAI list.

S813: The NWDAF performs DNAI topology information aggregation based on the collected topology information and the first DNAI list, to obtain network topology information of the first DNAI list.

S814: The NWDAF sends a query request response to the AF/NEF, and feeds back the network topology information of the first DNAI list that is obtained through aggregation.

The query request response may be an Nnwdaf_AnalyticsInfo_Request response message.

S815: The AF/NEF determines, based on the network topology information of the first DNAI list, an optimal DNAI to be accessed by the terminal group of the first service.

It should be noted that for an example implementation of S815, refer to the process in which the first network element determines the first MEC access point in Solution 1 of S401. Details are not described herein again.

S816: The AF/NEF sends the optimal DNAI to the service server.

S817: The AF/NEF sends the optimal DNAI to the SMF 1 of each UE through the PCF of each UE.

S818: The SMF 1 selects a local PSA for the UE based on the optimal DNAI, and adds a ULCL/BP.

For an example implementation of S818, refer to a process of adding a ULCL defined in 3GPP 23.502. Details are not described in this application.

S819: After path establishment is completed, the SMF 1 feeds back a path creation status to the AF/NEF.

The path creation status may include the determined optimal DNAI and a connectivity status from a terminal in the terminal group to the determined optimal DNAI (for example, all terminals in the group may connect to the determined optimal DNAI).

S820: The AF/NEF feeds back the path creation status to the service server.

S821: The service server sends, through an original user plane path, an address of an MEC server corresponding to the optimal DNAI to the UE based on the address of the MEC server corresponding to the optimal DNAI.

S822: The UE performs a service with the MEC server based on the address of the MEC server through a newly established DNAI path.

It should be noted that S803 to S807 and S817 to S821 are performed for each UE, and details are not described one by one again.

In Embodiment 1, a basic procedure of AF influence traffic routing is used to query surrounding DNAIs for UEs in the terminal group of the first service one by one, the list of DNAIs closest to the UEs is provided to the NWDAF, and the NWDAF is queried for the network topology information of the DNAIs. The AF/NEF determines the optimal DNAI based on the network topology information. Then, the AF/NEF allocates all UEs in the terminal group to the optimal DNAI through the AF influence traffic routing procedure.

Embodiment 2

Figure 9:
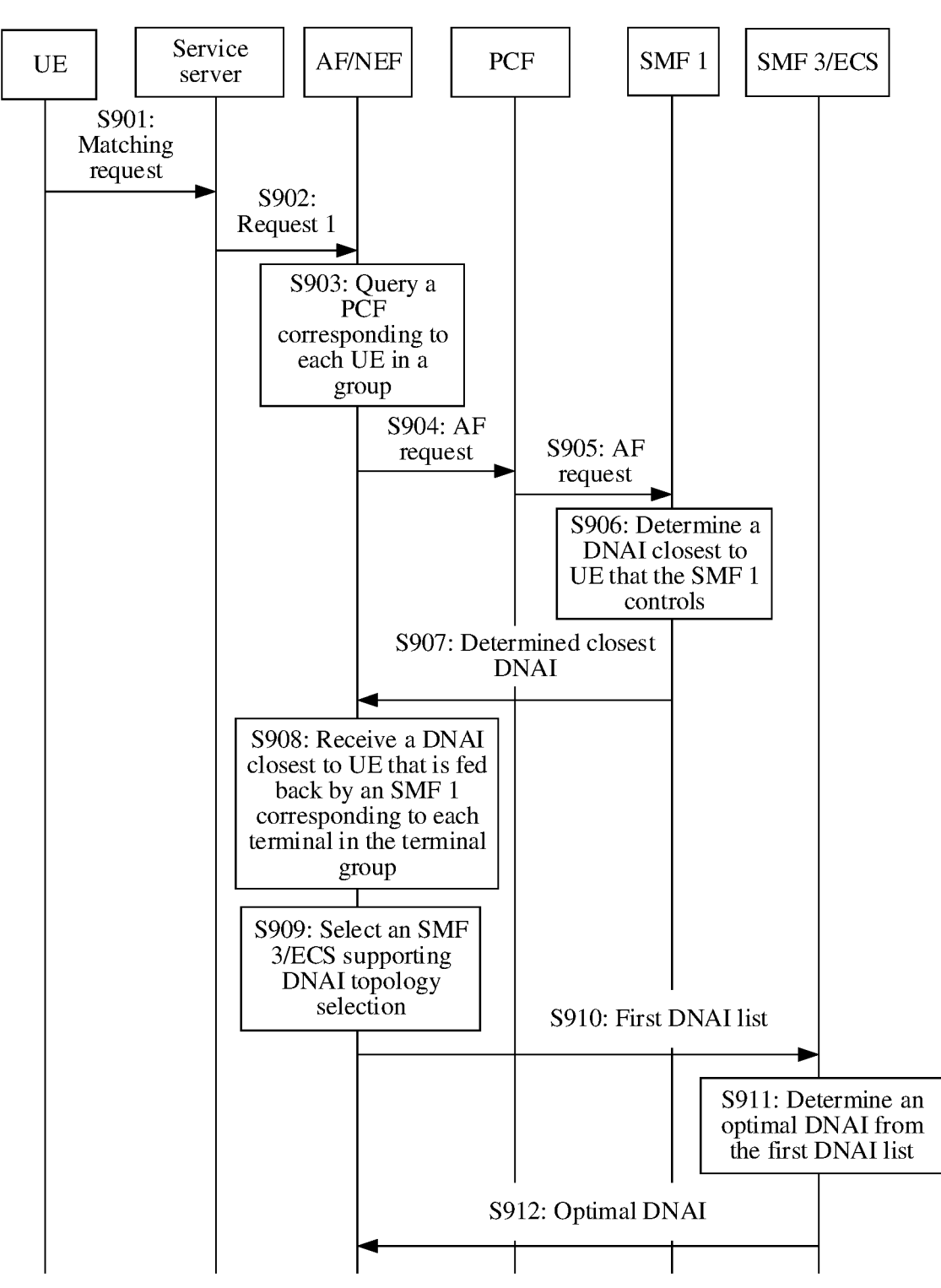
FIG. 9 is a schematic flowchart of still another method for determining an MEC access point according to an embodiment of this application.

A method for determining an MEC access point provided in Embodiment 2 of this application may be shown in FIG. 9. In this scenario, it is assumed that a plurality of UEs in a terminal group of a first service are controlled by a plurality of different SMFs. As shown in FIG. 9, the method may include the following steps.

S901: The plurality of UEs simultaneously initiate, through a user plane path, matching requests for the first service to a service server.

S902: The service server determines to enable an MEC server to provide a service for the UEs in the group, and sends a request 1 to an AF/NEF.

S903: The AF/NEF queries, via a BSF, a PCF corresponding to each UE in the group.

S904: The AF/NEF initiates an AF request to the PCF.

S905: The PCF forwards the AF request to an SMF 1 corresponding to the PCF.

S906: The SMF 1 determines a DNAI closest to UE controlled by the SMF 1.

S907: The SMF 1 feeds back the determined closest DNAI to the AF/NEF.

It should be noted that S903 to S907 are separately performed for each UE, and details are not described one by one again.

S908: The AF/NEF receives the DNAI that is closest to the UE and that is fed back by the SMF 1 corresponding to each terminal in the terminal group.

It should be noted that, in some embodiments, implementation of S901 to S908 is the same as the implementation of S801 to S808, and details are not described herein again.

S909: The AF/NEF selects an SMF 3/ECS that supports DNAI topology selection.

S910: The AF/NEF sends a first DNAI list to the SMF 3/ECS.

The first DNAI list includes DNAIs closest to the UEs in the terminal group.

S911: The SMF 3/ECS determines an optimal DNAI from the first DNAI list.

The SMF 3/ECS may determine the optimal DNAI based on network topology information of the DNAIs in the first DNAI list and a preset rule.

It should be noted that for an example implementation of S911, refer to the process in which the first network element determines the first MEC access point in Solution 1 of S401. Details are not described herein again.

In a possible implementation, the SMF 3/ECS locally stores the network topology information of the DNAIs in the first DNAI list.

In another possible implementation, if the network topology information of the first DNAI list is not locally stored in the SMF 3/ECS, the SMF 3/ECS may obtain the network topology information of the DNAIs in the first DNAI list by using the following process of step A to step D.

Step A: The SMF 3/ECS provides the first DNAI list to the NRF, and obtains an address of an SMF 2/OAM corresponding to each DNAI in the first DNAI list.

Step B: The SMF 3/ECS provides each SMF 2/OAM with the first DNAI list based on the address of the SMF 2/OAM, and requests topology information of DNAIs known to the SMF 2/OAM.

Step C: The SMF 2/OAM feeds back the topology information of the DNAIs known to the SMF 2/OAM in the first DNAI list to the SMF 3/ECS.

Step D: The SMF 3/ECS performs DNAI topology information aggregation based on the collected topology information and the first DNAI list, to obtain the network topology information of the first DNAI list.

S912: The SMF 3/ECS sends the optimal DNAI to the AF/NEF.

After S912, the AF/NEF sends the selected DNAI to the SMF of each UE through AF influence traffic routing of each UE according to the process of S816 to S822, to perform a DNAI change procedure.

Embodiment 2 is similar to Embodiment 1. First, a basic procedure of AF influence traffic routing is used to query surrounding DNAIs for UEs in the terminal group of the first service one by one, and the list of DNAIs closest to the UEs is provided to the SMF 3/ECS. The SMF 3/ECS queries the network topology information of the DNAIs, determines the optimal DNAI, and sends the optimal DNAI to the AF/NEF. Then, the AF/NEF allocates all UEs in the terminal group to the optimal DNAI through the AF influence traffic routing procedure.

Embodiment 3

Figure 10:
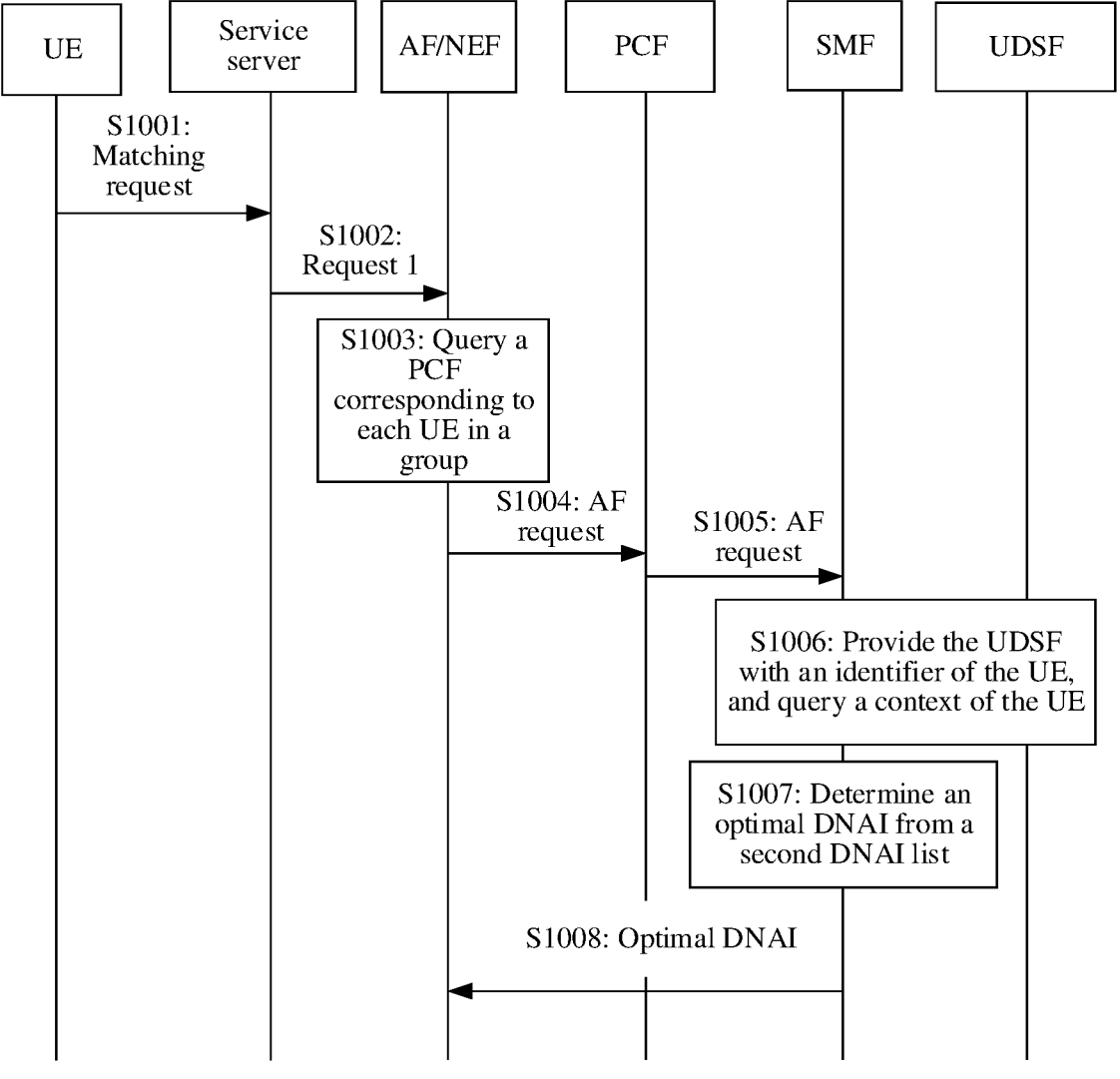
FIG. 10 is a schematic flowchart of still another method for determining an MEC access point according to an embodiment of this application.

A method for determining an MEC access point provided in Embodiment 3 of this application may be shown in FIG. 10. In this scenario, it is assumed that a plurality of UEs are controlled by different SMFs in a same SMF pool, and the different SMFs may perform data query via a UDSF. In addition, each SMF can control and adjust a UPF connected to the SMF. As shown in FIG. 10, the method may include the following steps.

S1001: The plurality of UEs simultaneously initiate, through a user plane path, matching requests for a first service to a service server.

S1002: The service server determines to enable an MEC server to provide a service for the UEs in the group, and sends a request 1 to an AF/NEF.

S1003: The AF/NEF queries, via a BSF, a PCF corresponding to each UE in the group.

S1004: The AF/NEF selects a PCF randomly and initiates an AF request to the selected PCF.

The AF request includes first indication information, identifiers of the UEs in the group of the first service, and an identifier of the first service. The first indication information indicates to query an optimal DNAI for accessing the first service by the UEs in the group.

For example, the identifiers of the UEs may be IP addresses of the UEs.

S1005: The PCF forwards the AF request to a corresponding SMF.

S1006: The SMF provides the identifiers of the UEs for the UDSF, to query contexts of the UEs.

The context of the UE includes network topology information of an access network device accessed by the UE and DNAIs supporting the first service, and network topology information of the DNAIs supporting the first service.

In S1006, the SMF determines, based on the AF request, that the optimal DNAI to be accessed by the group to which the identifiers of the terminals in the AF request belong is to be selected, and the SMF queries the UDSF for the contexts of the UEs.

S1007: The SMF determines an optimal DNAI from a second DNAI list based on a distribution status of the UEs and the network topology information in the contexts.

The second DNAI list includes all DNAIs that support the first service.

It should be noted that for an example implementation of S1007, refer to the process in which the first network element determines the first MEC access point in Solution 1 of S401. Details are not described herein again.

S1008: The SMF sends the optimal DNAI to the AF/NEF.

After S1008, the AF/NEF sends the determined optimal DNAI to the SMF of each UE via AF influence traffic routing of each UE according to the process of S816 to S822, to perform a DNAI change procedure.

The solution used in Embodiment 3 is that the AF/NEF selects only one PCF/SMF when sending the AF request, and the AF request carries the identifiers of all the UEs in the terminal group. The selected SMF queries other SMFs for UE-related information and topology information through the UDSF, selects a DNAI, and sends the determined optimal DNAI to the AF/NEF. The AF/NEF sends the selected optimal DNAI to the SMF of each UE via AF influence traffic routing of each UE, to perform a DNAI change procedure.

Embodiment 4

Figure 11:
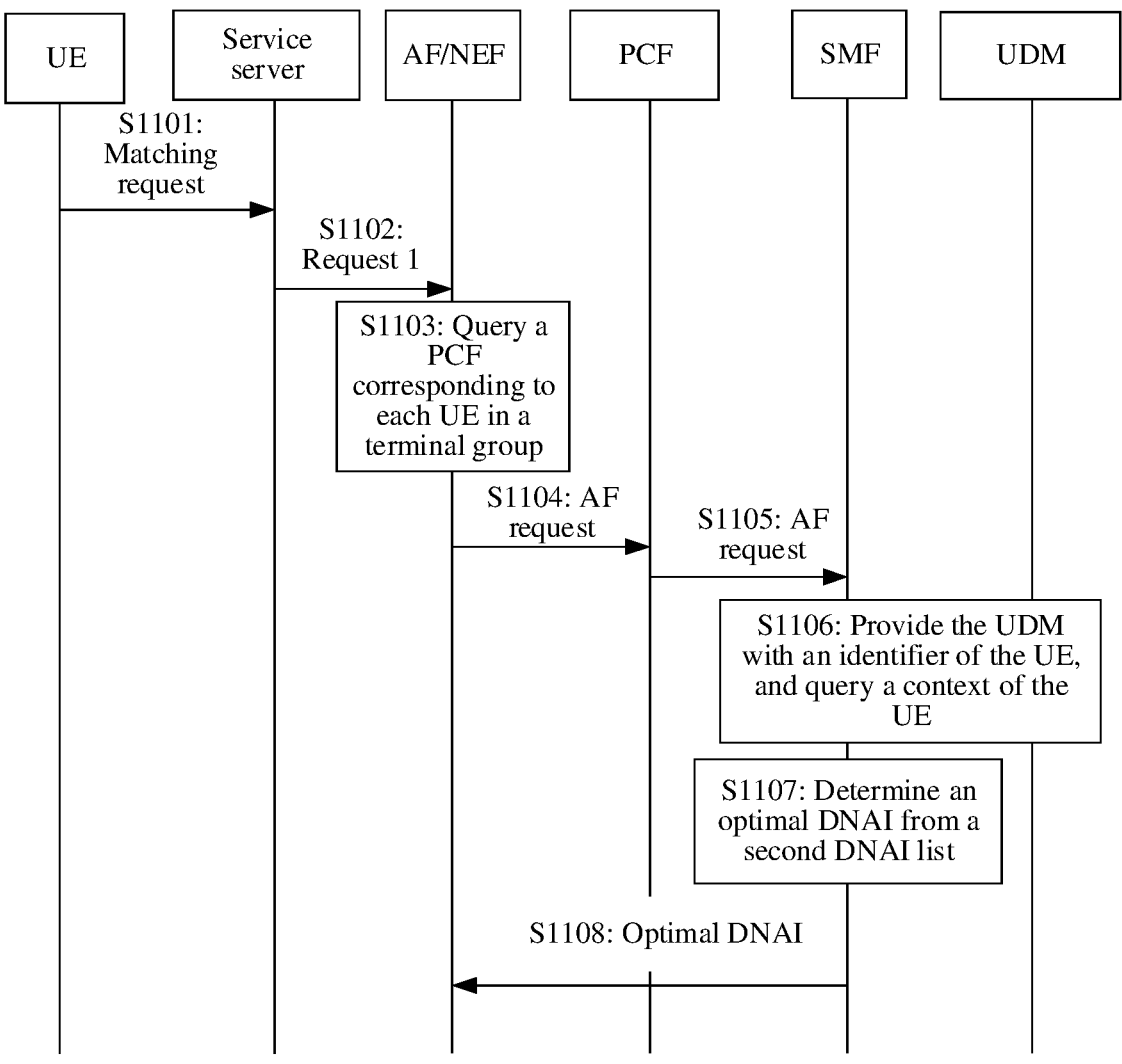
FIG. 11 is a schematic flowchart of still another method for determining an MEC access point according to an embodiment of this application.

A method for determining an MEC access point provided in Embodiment 4 of this application may be shown in FIG. 11. In this scenario, it is assumed that a plurality of UEs are controlled by different SMFs in a same SMF pool, and the different SMFs may perform data query through an interface between the SMFs. In addition, each SMF can control and adjust a UPF connected to the SMF. As shown in FIG. 11, the method may include the following steps.

S1101: The plurality of UEs simultaneously initiate, through a user plane path, matching requests for a first service to a service server.

S1102: The service server determines to enable an MEC server to provide a service for the UEs in the group, and sends a request 1 to an AF/NEF.

S1103: The AF/NEF queries, via a BSF, a PCF corresponding to each UE in the terminal group.

S1104: The AF/NEF selects a PCF randomly and initiates an AF request to the selected PCF.

S1105: The PCF forwards the AF request to a corresponding SMF.

It should be noted that S1101 to S1105 are the same as S1001 to S1005, and details are not described again.

S1106: The SMF provides identifiers of the UEs for a UDM, to query contexts of the UEs.

The contexts of the UEs are the same as the contexts in S1006, and details are not described again.

In S1006, the SMF determines, based on the AF request, that an optimal DNAI to be accessed by the terminal group to which the identifiers of the terminals in the AF request belong is to be selected, and the SMF queries the UDM for the contexts of the UEs.

S1107: The SMF determines the optimal DNAI from a second DNAI list based on a distribution status of the UEs and the network topology information in the contexts.

It should be noted that for an example implementation of S1107, refer to the process in which the first network element determines the first MEC access point in Solution 1 of S401. Details are not described herein again.

S1108: The SMF sends the optimal DNAI to the AF/NEF.

After S1108, the AF/NEF sends the selected optimal DNAI to the SMF of each UE via AF influence traffic routing of each UE according to the process of S816 to S822, to perform a DNAI change procedure.

The foregoing mainly describes the solutions provided in the embodiments of the present disclosure from the perspective of a working principle of a network element. It may be understood that, to implement the foregoing functions, each network element or the like includes a corresponding hardware structure and/or a software module for performing each function, and is referred to as an apparatus for selecting an MEC access point. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present specification.

In embodiments of the present disclosure, division into functional modules may be performed on the apparatus for determining an MEC access point and the like according to the foregoing method example. For example, each functional module may be obtained through division corresponding to each function, or two or more functions may be integrated into one processing module. The integrated module may be implemented in a form of hardware, or may be implemented in a form of a software functional module. It should be noted that in embodiments of the present description, module division is an example, and is merely a logical function division. In actual implementation, another division manner may be used.

Figure 12:
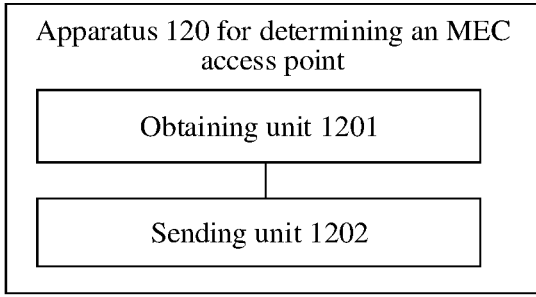
FIG. 12 is a schematic diagram of a structure of an apparatus for determining an MEC access point according to an embodiment of this application.

When each functional module is obtained through division based on each corresponding function, FIG. 12 shows an apparatus 120 for determining an MEC access point according to an embodiment of this application, configured to implement the functions of the first network element in the foregoing embodiment. The apparatus 120 for determining an MEC access point may be a first network element, or the apparatus 120 for determining an MEC access point may be deployed on the first network element. As shown in FIG. 12, the apparatus 120 for determining an MEC access point may include: an obtaining unit 1201 and a sending unit 1202. The obtaining unit 1201 is configured to perform the process S401 in FIG. 4, or the processes S501 to S504, S505, S511, and S512 in FIG. 5A and FIG. 5B, or the processes S601, S602, and S607 in FIG. 6, or the processes S701 and S706 in FIG. 7. The sending unit 1202 is configured to perform the process S402 in FIG. 4, or the process S513 in FIG. 5B, or the process S608 in FIG. 6, or the process S707 in FIG. 7. All related content of the steps in the foregoing method embodiments may be cited in function descriptions of a corresponding functional module. Details are not described herein again.

Figure 13:
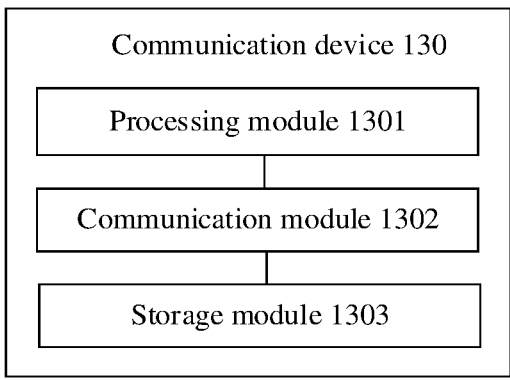
FIG. 13 is a schematic diagram of a structure of another communication device according to an embodiment of this application.

When an integrated unit is used, FIG. 13 shows a communication device 130 according to an embodiment of this application. The communication device 130 is configured to implement the functions of the first network element in the foregoing method. The communication device 130 includes at least one processing module 1301. For example, the processing module 1301 may be configured to perform the process S401 in FIG. 4, or the processes S501 to S504, S505, S511, and S512 in FIG. 5A and FIG. 5B, or the processes S601, S602, and S607 in FIG. 6, or the processes S701 and S706 in FIG. 7. For details, refer to detailed descriptions in the method example. Details are not described herein again.

The communication device 130 may further include at least one storage module 1303, configured to store program instructions and/or data. The storage module 1303 is coupled to the processing module 1301. The coupling in this embodiment of this application may be indirect coupling or a communication connection between apparatuses, units, or modules in an electrical form, a mechanical form, or another form, and is used for information exchange between the apparatuses, the units, or the modules. The processing module 1301 may cooperate with the storage module 1303. The processing module 1301 may execute the program instructions stored in the storage module 1303. At least one of the at least one storage module may be included in the processing module.

The communication device 130 may further include a communication module 1302, configured to communicate with another device through a transmission medium, so as to determine that the communication device 130 can communicate with another device. The communication module 1302 is configured to communicate with another device. For example, the processor 1301 may use the communication module 1302 to perform the process S402 in FIG. 4, or the process S513 in FIG. 5B, or the process S608 in FIG. 6, or the process S707 in FIG. 7.

When the processing module 1301 is a processor, the storage module 1303 is a memory, and the communication module 1302 is a communication interface, the communication device 130 in this application may be the communication device 30 shown in FIG. 3.

As described above, the apparatus 120 for determining an MEC access point or the communication device 130 provided in embodiments of this application may be configured to implement the functions of the first network element in the methods implemented in embodiments of this application. For ease of description, only a part related to the embodiment of this application is shown. For specific technical details that are not disclosed, refer to embodiments of this application.

Figure 14:
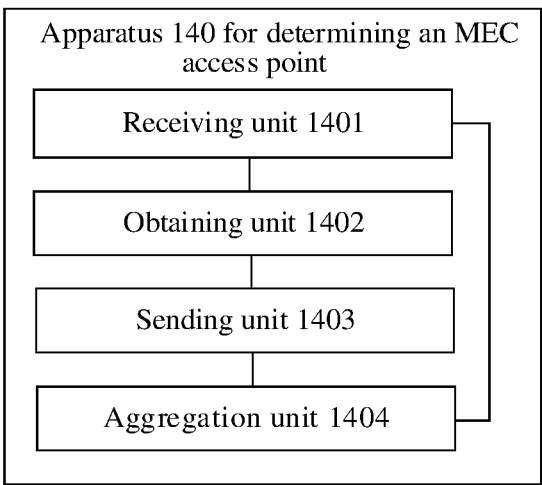
FIG. 14 is a schematic diagram of a structure of another apparatus for determining an MEC access point according to an embodiment of this application.

When each functional module is obtained through division based on each corresponding function, FIG. 14 shows an apparatus 140 for determining an MEC access point according to an embodiment of this application, configured to implement the functions of the third network element in the foregoing embodiment. The apparatus 140 for determining an MEC access point may be the third network element, or the apparatus 140 for determining an MEC access point may be deployed on the third network element. As shown in FIG. 14, the apparatus 140 for determining an MEC access point may include: a receiving unit 1401, an obtaining unit 1402, a sending unit 1403, and an aggregation unit 1404. The receiving unit 1401 is configured to perform the processes S506 and S509 in FIG. 5A and FIG. 5B. The obtaining unit 1402 is configured to perform the process S507 in FIG. 5A. The sending unit 1403 is configured to perform the processes S508 and S511 in FIG. 5B. The aggregation unit 1404 is configured to perform the process S510 in FIG. 5B. All related content of the steps in the foregoing method embodiments may be cited in function descriptions of a corresponding functional module. Details are not described herein again.

Figure 15:
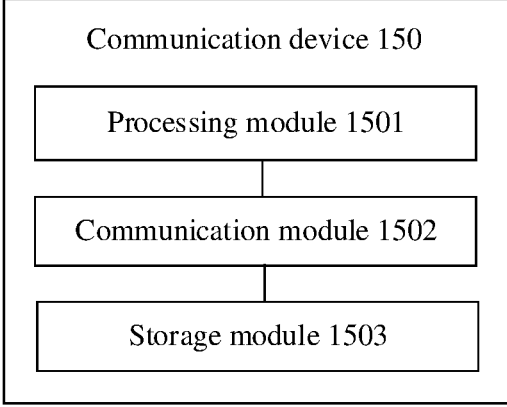
FIG. 15 is a schematic diagram of a structure of still another communication device according to an embodiment of this application.

When an integrated unit is used, FIG. 15 shows a communication device 150 according to an embodiment of this application. The communication device 150 is configured to implement the functions of the third network element in the foregoing method. The communication device 150 includes at least one processing module 1501. For example, the processing module 1501 may be configured to perform the process S507 in 5. For details, refer to the detailed description in the method example. Details are not described herein again.

The communication device 150 may further include at least one storage module 1503, configured to store program instructions and/or data. The storage module 1503 is coupled to the processing module 1501. The coupling in this embodiment of this application may be indirect coupling or a communication connection between apparatuses, units, or modules in an electrical form, a mechanical form, or another form, and is used for information exchange between the apparatuses, the units, or the modules. The processing module 1501 may cooperate with the storage module 1503. The processing module 1501 may execute the program instructions stored in the storage module 1503. At least one of the at least one storage module may be included in the processing module.

The communication device 150 may further include a communication module 1502, configured to communicate with another device through a transmission medium, so as to determine that the communication device 150 can communicate with another device. The communication module 1502 is configured to communicate with another device. For example, the processor 1501 may perform the processes S506, S508, S509, and S510 in FIG. 5A and FIG. 5B through the communication module 1502.

When the processing module 1501 is a processor, the storage module 1503 is a memory, and the communication module 1502 is a communication interface, the communication device 150 in this application may be the communication device 30 shown in FIG. 3.

As described above, the apparatus 140 for determining an MEC access point or the communication device 150 provided in embodiments of this application may be configured to implement the functions of the third network element in the methods implemented in embodiments of this application. For ease of description, only a part related to the embodiment of this application is shown. For specific technical details that are not disclosed, refer to embodiments of this application.

Figure 16:
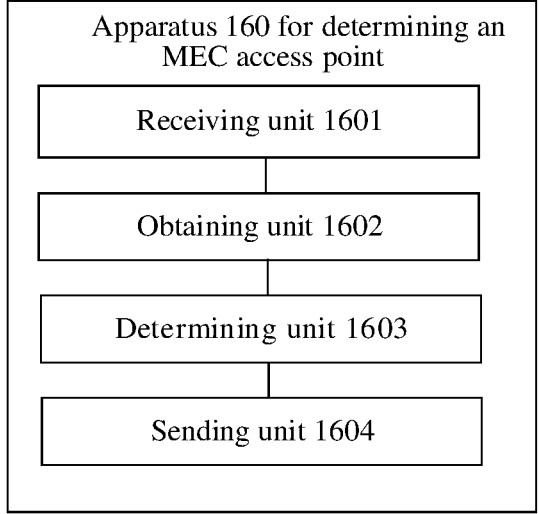
FIG. 16 is a schematic diagram of a structure of still another apparatus for determining an MEC access point according to an embodiment of this application.

When each functional module is obtained through division based on each corresponding function, FIG. 16 shows an apparatus 160 for determining an MEC access point according to an embodiment of this application, configured to implement the functions of the fourth network element in the foregoing embodiment. The apparatus 160 for determining an MEC access point may be the fourth network element, or the apparatus 160 for determining an MEC access point may be deployed on the fourth network element. As shown in FIG. 16, the apparatus 160 for determining an MEC access point may include: a receiving unit 1601, an obtaining unit 1602, a determining unit 1603, and a sending unit 1604. The receiving unit 1601 is configured to perform the process S603 in FIG. 6. The obtaining unit 1602 is configured to perform the process S604 in FIG. 6. The determining unit 1603 is configured to perform the process S605 in FIG. 6. The sending unit 1604 is configured to perform the process S606 in FIG. 6. All related content of the steps in the foregoing method embodiments may be cited in function descriptions of a corresponding functional module. Details are not described herein again.

Figure 17:
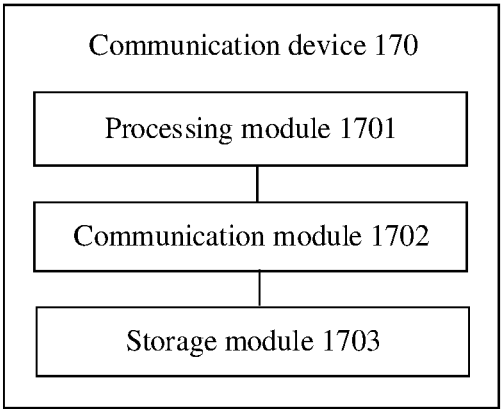
FIG. 17 is a schematic diagram of a structure of still another communication device according to an embodiment of this application.

When an integrated unit is used, FIG. 17 shows a communication device 170 according to an embodiment of this application. The communication device 170 is configured to implement the functions of the fourth network element in the foregoing method. The communication device 170 includes at least one processing module 1701. For example, the processing module 1701 may be configured to perform the processes S604 and S605 in FIG. 6. For details, refer to detailed descriptions in the method example. Details are not described herein again.

The communication device 170 may further include at least one storage module 1703, configured to store program instructions and/or data. The storage module 1703 is coupled to the processing module 1701. The coupling in this embodiment of this application may be indirect coupling or a communication connection between apparatuses, units, or modules in an electrical form, a mechanical form, or another form, and is used for information exchange between apparatuses, the units, or the modules. The processing module 1701 may cooperate with the storage module 1703. The processing module 1701 may execute the program instructions stored in the storage module 1703. At least one of the at least one storage module may be included in the processing module.

The communication device 170 may further include a communication module 1702, configured to communicate with another device through a transmission medium, so as to determine that the communication device 170 can communicate with another device. The communication module 1702 is configured to communicate with another device. For example, the processor 1701 may perform the processes S603 and S606 in FIG. 6 through the communication module 1702.

When the processing module 1701 is a processor, the storage module 1703 is a memory, and the communication module 1702 is a communication interface, the communication device 170 in this application may be the communication device 30 shown in FIG. 3.

As described above, the apparatus 160 for determining an MEC access point or the communication device 170 provided in embodiments of this application may be configured to implement the functions of the fourth network element in the methods implemented in embodiments of this application. For ease of description, only a part related to the embodiment of this application is shown. For specific technical details that are not disclosed, refer to embodiments of this application.

Figure 18:
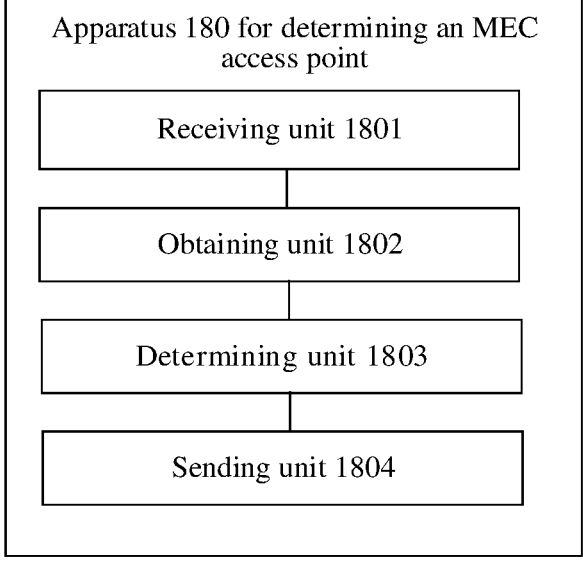
FIG. 18 is a schematic diagram of a structure of still another apparatus for determining an MEC access point according to an embodiment of this application.

When each functional module is obtained through division based on each corresponding function, FIG. 18 shows an apparatus 180 for determining an MEC access point according to an embodiment of this application, configured to implement the functions of the fifth network element in the foregoing embodiment. The apparatus 180 for determining an MEC access point may be the fifth network element, or the apparatus 180 for determining an MEC access point may be deployed on the fifth network element. As shown in FIG. 18, the apparatus 180 for determining an MEC access point may include: a receiving unit 1801, an obtaining unit 1802, a determining unit 1803, and a sending unit 1804. The receiving unit 1801 is configured to perform the process S702 in FIG. 7. The obtaining unit 1802 is configured to perform the process S703 in FIG. 7. The determining unit 1803 is configured to perform the process S704 in FIG. 7. The sending unit 1804 is configured to perform the process S705 in FIG. 7. All related content of the steps in the foregoing method embodiments may be cited in function descriptions of a corresponding functional module. Details are not described herein again.

Figure 19:
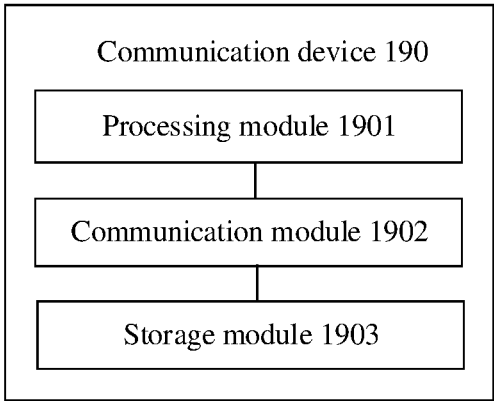
FIG. 19 is a schematic diagram of a structure of still another communication device according to an embodiment of this application.

When an integrated unit is used, FIG. 19 shows a communication device 190 according to an embodiment of this application. The communication device 190 is configured to implement the functions of the fifth network element in the foregoing method. The communication device 190 includes at least one processing module 1901. For example, the processing module 1901 may be configured to perform the processes S703 and S704 in FIG. 7. For details, refer to detailed descriptions in the method example. Details are not described herein again.

The communication device 190 may further include at least one storage module 1903, configured to store program instructions and/or data. The storage module 1903 is coupled to the processing module 1901. The coupling in this embodiment of this application may be indirect coupling or a communication connection between apparatuses, units, or modules in an electrical form, a mechanical form, or another form, and is used for information exchange between apparatuses, the units, or the modules. The processing module 1901 may cooperate with the storage module 1903. The processing module 1901 may execute the program instruction stored in the storage module 1903. At least one of the at least one storage module may be included in the processing module.

The communication device 190 may further include a communication module 1902, configured to communicate with another device through a transmission medium, so as to determine that the communication device 190 can communicate with another device. The communication module 1902 is configured to communicate with another device. For example, the processor 1901 may perform the processes S702 and S705 in FIG. 7 through the communication module 1902.

When the processing module 1901 is a processor, the storage module 1903 is a memory, and the communication module 1902 is a communication interface, the communication device 190 in this application may be the communication device 30 shown in FIG. 3.

As described above, the apparatus 180 for determining an MEC access point or the communication device 190 provided in embodiments of this application may be configured to implement the functions of the fifth network element in the methods implemented in embodiments of this application. For ease of description, only a part related to embodiment of this application is shown. For specific technical details that are not disclosed, refer to embodiments of this application.

An embodiment of this application further provides a communication system. The system may include a communication device 130.

In a possible implementation, the communication system may further include one or more of the communication device 150, the communication device 170, and the communication device 190.

In another form of this embodiment, a computer-readable storage medium is provided. The computer-readable storage medium stores instructions. When the instructions are executed, the method for determining an MEC access point in the foregoing method embodiment is performed.

In another form of this embodiment, a computer program product including instructions is provided. When the computer program product runs on a computer, the computer is enabled to perform the method for determining an MEC access point in the foregoing method embodiment.

An embodiment of this application further provides a chip system. The chip system includes a processor, configured to implement the technical method in the embodiments of the present disclosure. In a possible design, the chip system further includes a memory, configured to store program instructions and/or data in this embodiment. In a possible design, the chip system further includes a memory, configured to be used by the processor to invoke application program code stored in the memory. The chip system may include one or more chips, or may include a chip and another discrete component. This is not limited in this embodiment of this application.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a device (which may be a single-chip processor, a chip, or the like) or a processor to perform all or some of the steps of the methods described in embodiments of this application. The foregoing storage medium includes: The foregoing storage medium includes: any medium that can store program code, such as a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:

obtaining, by a first network element, a first multi-access edge computing (MEC) access point to be accessed by terminals included in a terminal group of a first service, wherein the first MEC access point is obtained based on network topology information of MEC access points that are respectively closest to all of the terminals in the terminal group and that support the first service, wherein the network topology information indicates at least one of whether at least two MEC access points are connected or performance of a link between at least two MEC access points; and the terminal group of the first service comprises one or more of a terminal requesting the first service or a terminal subscribing to the first service;

receiving, by a third network element, second information from the first network element, wherein the second information comprises identifiers of the MEC access points;

obtaining, by the third network element, a sixth network element corresponding to each of the MEC access points;

sending, by the third network element, fifth information to the sixth network element corresponding to each of the MEC access points, wherein the fifth information comprises the identifiers of the MEC access points;

receiving, by the third network element from the sixth network element corresponding to each of the MEC access points, topology information of MEC access points known to the sixth network element in the MEC access points, wherein the topology information is obtained based on the fifth information and indicates at least one of whether at least two MEC access points are connected or performance of the link between at least two MEC access points;

aggregating, by the third network element, the topology information to obtain network topology information; and sending, by the third network element, the network topology information to the first network element, wherein the network topology information is used to determine the first MEC access point to be accessed by the terminal group of the first service; and sending, by the first network element, an identifier of the first MEC access point to a session management network element that controls each of the terminals of the terminal group, wherein the identifier of the first MEC access point is used by each of the terminals of the terminal group to access the first MEC access point.

2. The method according to claim 1, wherein the obtaining, by the first network element, the first MEC access point to be accessed by the terminal group of the first service comprises:

sending, by the first network element, first information to a second network element corresponding to each of the terminals of the terminal group, wherein the first information comprises identifiers of the MEC access points supporting the first service and an identifier of a terminal managed by the second network element in the terminal group;

receiving, by the first network element from the second network element corresponding to the terminals of the terminal group, an identifier of an MEC access point closest to each of the terminals that is determined based on the first information;

sending, by the first network element, third information to a fourth network element, wherein the third information comprises the identifier of the MEC access point closest to each of the terminals; and receiving, by the first network element from the fourth network element, the identifier of the first MEC access point that is determined based on the third information.

3. The method according to claim 2, further comprising:

receiving, by the fourth network element, the third information from the first network element, wherein the third information comprises the identifiers of the MEC access points;

obtaining, by the fourth network element, the network topology information of the MEC access points;

determining, by the fourth network element from the MEC access points according to a preset rule and the network topology information, the first MEC access point to be accessed by the terminal group of the first service; and sending, by the fourth network element, the identifier of the first MEC access point to the first network element.

4. The method according to claim 3, wherein the obtaining, by the fourth network element, the network topology information of the MEC access points comprises:

obtaining, by the fourth network element, a sixth network element corresponding to each of the MEC access points;

sending, by the fourth network element, additional information to the sixth network element corresponding to each of the MEC access points, wherein the additional information comprises the identifiers of the MEC access points;

receiving, by the fourth network element from the sixth network element corresponding to each of the MEC access points, topology information of MEC access points known to the sixth network element in the MEC access points, wherein the topology information is obtained based on the additional information, and the topology information indicates at least one of whether at least two MEC access points are connected or performance of the link between at least two MEC access points; and aggregating the topology information to obtain the network topology information.

5. The method according to claim 1, wherein the obtaining, by the first network element, the first MEC access point to be accessed by the terminal group of the first service comprises:

sending, by the first network element, fourth information to a fifth network element, wherein the fourth information comprises an identifier of each of the terminals of the terminal group and identifiers of the MEC access points supporting the first service; and receiving, by the first network element from the fifth network element, the identifier of the first MEC access point that is determined based on the fourth information.

6. The method according to claim 5, further comprising:

receiving, by the fifth network element, the fourth information from the first network element, wherein the fourth information comprises identifiers of the terminals in the terminal group of the first service and the identifiers of the MEC access points supporting the first service;

obtaining, by the fifth network element, a context of each of the terminals in the terminal group, wherein the context of each terminal comprises network topology information of an access network element accessed by the terminal and the MEC access points supporting the first service, and the network topology information indicates at least one of (1) whether the access network element is connected to the MEC access points, and whether at least two MEC access points are connected; or (2) performance of links between the access network element and the MEC access points, and between at least two MEC access points;

determining, by the fifth network element according to a preset rule and the network topology information in the context of each of the terminals of the terminal group, the first MEC access point to be accessed by the terminal group from the MEC access points supporting the first service; and sending, by the fifth network element, the identifier of the first MEC access point to the first network element.

7. The method according to claim 6, wherein the obtaining, by the fifth network element, the context of each of the terminals in the terminal group comprises:

obtaining, by the fifth network element, the context of each of the terminals in the terminal group by querying a data storage function; or querying, by the fifth network element from a unified data management platform, session management network elements corresponding to terminals other than a terminal corresponding to the fifth network element; and separately obtaining, by the fifth network element from the session management network elements corresponding to the terminals, contexts of the terminals other than the terminal corresponding to the fifth network element.

8. The method according to claim 1, wherein the obtaining, by the first network element, the first MEC access point to be accessed by the terminal group of the first service comprises:

sending, by the first network element, first information to a second network element corresponding to each of the terminals of the terminal group, wherein the first information comprises identifiers of the MEC access points supporting the first service and an identifier of a terminal managed by the second network element in the terminal group;

receiving, by the first network element from the second network element corresponding to the terminals of the terminal group, an identifier of an MEC access point closest to each of the terminals that is determined based on the first information; and determining, by the first network element according to a preset rule and the network topology information, the first MEC access point from the MEC access points that is respectively closest to each of the terminals of the terminal group.

9. The method according to claim 8, wherein the preset rule comprises criteria for determining the first MEC access point from the network topology information based on one or more of loads or delays of the MEC access points.

10. The method according to claim 1, further comprising:

obtaining, by a fourth network element, a sixth network element corresponding to each of the MEC access points;

sending, by the fourth network element, additional information to a sixth network element corresponding to each of the MEC access points, wherein the additional information comprises the identifiers of the MEC access points;

receiving, by the fourth network element from the sixth network element corresponding to each of the MEC access points, topology information of MEC access points known to the sixth network element in the MEC access points, wherein the topology information is obtained based on the additional information, and the topology information indicates at least one of whether at least two MEC access points are connected or performance of the link between at least two MEC access points; and aggregating the topology information to obtain the network topology information.

11. A first network element, comprises:

at least one processor; and a memory, storing instructions, which when executed by the at least one processor, cause the first network element to:

obtain a first multi-access edge computing (MEC) access point to be accessed by terminals included in a terminal group of a first service, wherein the first MEC access point is obtained based on network topology information of MEC access points that are respectively closest to all of the terminals in the terminal group and that support the first service, wherein the network topology information indicates at least one of whether at least two MEC access points are connected, or performance of a link between at least two MEC access points; and the terminal group of the first service comprises one or more of a terminal requesting the first service or a terminal subscribing to the first service;

send second information to a third network element, wherein the second information comprises identifiers of the MEC access points, to cause the third network element to:

obtain a sixth network element corresponding to each of the MEC access points;

send fifth information to the sixth network element corresponding to each of the MEC access points, wherein the fifth information comprises the identifiers of the MEC access points;

receive, from the sixth network element corresponding to each of the MEC access points, topology information of MEC access points known to the sixth network element in the MEC access points, and the topology information is obtained based on the fifth information and indicates at least one of whether at least two MEC access points are connected or performance of the link between at least two MEC access points;

aggregate the topology information to obtain network topology information; and send the network topology information to the first network element;

receive, from the third network element, the network topology information obtained based on the second information, wherein the network topology information is used to determine an MEC access point to be accessed by the terminal group of the first service; and send an identifier of the first MEC access point to a session management network element that controls each of the terminals of the terminal group, wherein the identifier of the first MEC access point is used by each of the terminals of the terminal group to access the first MEC access point.

12. The first network element according to claim 11, wherein the first network element is further caused to:

send first information to a second network element corresponding to each of the terminals of the terminal group, wherein the first information comprises identifiers of the MEC access points supporting the first service and an identifier of a terminal managed by the second network element in the terminal group;

receive, from the second network element corresponding to the terminals of the terminal group, an identifier of an MEC access point closest to each of the terminals that is determined based on the first information; and determine, according to a preset rule and the network topology information, the first MEC access point from the MEC access points that is respectively closest to each of the terminals of the terminal group.

13. The first network element according to claim 12, wherein the preset rule comprises criteria for determining the first MEC access point from the network topology information based on one or more of loads or delays of the MEC access points.

14. The first network element according to claim 11, wherein the first network element is further caused to:

send first information to a second network element corresponding to each of the terminals of the terminal group, wherein the first information comprises identifiers of the MEC access points supporting the first service and an identifier of a terminal managed by the second network element in the terminal group;

receive, from the second network element corresponding to each of the terminals of the terminal group, an identifier of an MEC access point closest to each of the terminals that is determined based on the first information;

send third information to a fourth network element, wherein the third information comprises the identifier of the MEC access point closest to each of the terminals; and receive, from the fourth network element, the identifier of the first MEC access point that is determined based on the third information.

15. The first network element according to claim 11, wherein the first network element is further caused to:

send fourth information to a fifth network element, wherein the fourth information comprises an identifier of the terminals of the terminal group and identifiers of the MEC access points supporting the first service; and receive, from the fifth network element, the identifier of the first MEC access point that is determined based on the fourth information.

16. A communication system, comprising:

a first network element, wherein the first network element comprises:

at least one processor; and a memory, storing instructions, which when executed by the at least one processor, cause the first network element to:

obtain a first multi-access edge computing (MEC) access point to be accessed by terminals included in a terminal group of a first service, wherein the first MEC access point is obtained based on network topology information of MEC access points that are respectively closest to all of the terminals in the terminal group and that support the first service, wherein the network topology information indicates at least one of whether at least two MEC access points are connected, or performance of a link between at least two MEC access points; and the terminal group of the first service comprises one or more of a terminal requesting the first service or a terminal subscribing to the first service; and send an identifier of the first MEC access point to a session management network element that controls each of the terminals of the terminal group, wherein the identifier of the first MEC access point is used by each of the terminals of the terminal group to access the first MEC access point; and a third network element configured to:

receive second information from the first network element, wherein the second information comprises identifiers of the MEC access points, and the MEC access points support the first service;

obtain a sixth network element corresponding to each of the MEC access points;

send fifth information to the sixth network element corresponding to each of the MEC access points, wherein the fifth information comprises the identifiers of the MEC access points;

receive, from the sixth network element corresponding to each of the MEC access points, topology information of MEC access points known to the sixth network element in the MEC access points, and the topology information is obtained based on the fifth information and indicates at least one of whether at least two MEC access points are connected or performance of the link between at least two MEC access points;

aggregate the topology information to obtain network topology information; and send the network topology information to the first network element, wherein the network topology information is used to determine an MEC access point to be accessed by the terminal group of the first service, and the terminal group of the first service.

17. The communication system according to claim 16, further comprising:

a fourth network element configured to:

receive third information from the first network element, wherein the third information comprises identifiers of the MEC access points, and the MEC access points support the first service;

obtain network topology information of the MEC access points, wherein the network topology information indicates at least one of whether at least two MEC access points are connected or performance of the link between at least two MEC access points;

determine, from the MEC access points according to a preset rule and the network topology information, the first MEC access point to be accessed by the terminal group of the first service; and send the identifier of the first MEC access point to the first network element.

18. The communication system according to claim 17, wherein the fourth network element is further configured to:

obtain a sixth network element corresponding to each of the MEC access points;

send additional information to the sixth network element corresponding to each of the MEC access points, wherein the additional information comprises the identifiers of the MEC access points;

receive, from the sixth network element corresponding to each of the MEC access points, topology information of MEC access points known to the sixth network element in the MEC access points, wherein the topology information is obtained based on the additional information, and the topology information indicates at least one of whether at least two MEC access points are connected or performance of the link between at least two MEC access points; and aggregate the topology information to obtain the network topology information.

19. The communication system according to claim 16, further comprising:

a fifth network element configured to:

receive fourth information from the first network element, wherein the fourth information comprises identifiers of the terminals in the terminal group of the first service and the identifiers of MEC access points supporting the first service;

obtain a context of each of the terminals in the terminal group, wherein the context of each terminal comprises network topology information of an access network element accessed by the terminal and the MEC access points supporting the first service, and the network topology information indicates at least one of (1) whether the access network element is connected to the MEC access points, and whether at least two MEC access points are connected; or (2) performance of links between the access network element and the MEC access points, and between at least two MEC access points;

determine, according to a preset rule and the network topology information in the context of each of the terminals of the terminal group, the first MEC access point to be accessed by the terminal group from the MEC access points supporting the first service; and send the identifier of the first MEC access point to the first network element.

20. The communication system according to claim 17, wherein the preset rule comprises criteria for determining the first MEC access point from the network topology information based on one or more of loads or delays of the MEC access points.

* * * * *